(12) United States Patent
Watanabe

(10) Patent No.: US 9,615,602 B2
(45) Date of Patent: Apr. 11, 2017

(54) JUICE EXTRACTOR AND JUICE EXTRACTOR BODY

(71) Applicant: YAMATO CO., LTD., Suwa-shi, Nagano (JP)

(72) Inventor: Takashi Watanabe, Suwa (JP)

(73) Assignee: YAMATO CO., LTD., Suwa-Shi, Nagano (JP)

( * ) Notice: Subject to any disclaimer, the term of this patent is extended or adjusted under 35 U.S.C. 154(b) by 48 days.

(21) Appl. No.: 14/407,787

(22) PCT Filed: May 30, 2014

(86) PCT No.: PCT/JP2014/064451
§ 371 (c)(1),
(2) Date: Dec. 12, 2014

(87) PCT Pub. No.: WO2015/001882
PCT Pub. Date: Jan. 8, 2015

(65) Prior Publication Data
US 2015/0237910 A1    Aug. 27, 2015

(30) Foreign Application Priority Data
Jul. 1, 2013    (JP) ................. 2013-137708

(51) Int. Cl.
*A23N 1/02*      (2006.01)
*A47J 43/07*     (2006.01)
*A47J 19/02*     (2006.01)

(52) U.S. Cl.
CPC .............. *A23N 1/02* (2013.01); *A47J 19/027* (2013.01); *A47J 43/0711* (2013.01)

(58) Field of Classification Search
CPC ........ A23N 1/02; A47J 43/0711; A47J 19/027
(Continued)

(56) References Cited
U.S. PATENT DOCUMENTS 6,955,110 B1 * 10/2005 Spletzer ............. A22C 17/0006
                                                241/260.1
2006/0171251 A1 * 8/2006 Busick ................. A47J 43/0711
                                                366/312
(Continued)

FOREIGN PATENT DOCUMENTS

JP    1978-051365 U    5/1978
JP    1981-035315 U    4/1981
(Continued)

OTHER PUBLICATIONS

Office Action of Japanese corresponding Patent Application No. 2014-207570 mailed Jul. 28, 2015.
(Continued)

*Primary Examiner* — David Angwin
*Assistant Examiner* — Biniam Asmelash
(74) *Attorney, Agent, or Firm* — Muncy, Geissler, Olds & Lowe, P.C.

(57) ABSTRACT

Provided is a juice extractor, a juice extractor body and flexible blade therefo that can provide enjoyment to people when extracting juice from fruit or the like and when drinking fruit juice obtained by juice extraction; and that has the structures which are simple and can be put into practical use. The juice extractor includes: rotating shaft 21; flexible blade 23 arranged around rotating shaft 21 with a longitudinal direction thereof being coincident with an axial direction of rotating shaft 21; and blade guide 25 provided at an intermediate position of the longitudinal direction of flexible blade 23. One end 23*a* in the longitudinal direction of flexible blade 23 is configured to be slidable in the axial direction of rotating shaft 21, and the other end 23*b* in the longitudinal direction of the flexible blade is coupled to axis member, which extends from blade guide 25 to the other end 23*b* side of flexible blade 23, or to rotating shaft 21. The form of flexible blade 23 changes, between the other end 23*b*
(Continued)

of flexible blade 23 and blade guide 25, from the linearly extended form to the bent and outwardly expanded form or vice versa, in association with sliding of one end 23*a* of flexible blade 23.

7 Claims, 21 Drawing Sheets

(58) Field of Classification Search
USPC .................. 99/501, 502, 503, 504, 509, 510
See application file for complete search history.

(56) References Cited

U.S. PATENT DOCUMENTS

| | | | |
|---|---|---|---|
| 2009/0162508 A1* | 6/2009 | Davies .................... | A47J 19/02 426/481 |
| 2010/0143558 A1* | 6/2010 | Aharonovitch .......... | A23N 1/00 426/489 |
| 2011/0232507 A1* | 9/2011 | Aharonovitch .......... | A23N 1/02 99/501 |
| 2012/0081993 A1* | 4/2012 | Annis .................. | A47J 43/0711 366/309 |
| 2012/0120755 A1* | 5/2012 | Fallowes .............. | A47J 43/0711 366/312 |

FOREIGN PATENT DOCUMENTS

| | | |
|---|---|---|
| JP | 1982-004894 Y2 | 1/1982 |
| JP | 1991-055010 U | 5/1991 |
| JP | 04-170910 A | 6/1992 |
| JP | 09-294672 A | 11/1997 |
| JP | 2001-204639 A | 7/2001 |
| JP | 3172696 U | 12/2011 |

OTHER PUBLICATIONS

English translation of International Search Report of PCT/JP2014/064451.
Extended European Search Report for application No. 14820057.9 mailed May 6, 2016.

\* cited by examiner (A)

(B)

(A)

(B)

JUICE EXTRACTOR AND JUICE EXTRACTOR BODY

CROSS REFERENCE TO RELATED APPLICATIONS

This application is a national stage of International Application No. PCT/JP2014/064451, which was filed on May 30, 2014, and which claims priority to JP 2013-137708 which was filed on Jul. 1, 2013, and which are both herein incorporated by reference.

FIELD OF THE INVENTION

The present invention relates to a juice extractor, a juice extractor body and a flexible blade for such juice extractor, and in particular, to a juice extractor that can extract juice while substantially retaining the shape of a material such as fruit or the like, a juice extractor body, for use in such juice extractor, that is inserted inside the material and that performs juice extraction therein, and a flexible blade for use in such juice extractor.

BACKGROUND ART

Mixers and juicers are commonly used when obtaining fruit juice or vegetable juice. Mixers and juicers obtain fruit juice or vegetable juice by cutting, crushing and compressing materials such as fruit, vegetables or the like. Meanwhile, when obtaining fruit juice from materials, such as grapefruit, lemon or the like, with a relatively thick skin, juice extractors have been proposed which are of the type that leaves the skin as is and that performs juice extraction on the inner side of the skin.

The above-mentioned juice extractors leave the skin of the material as is and perform juice extraction on the inner side of the skin. These juice extractors can provide those who perform the juice extraction with more enjoyment in their performance of the juice extraction work than in the case where the juice extraction is performed using mixers or juicers. In addition, since the skin of the material serves as a vessel, such juice extractors can provide the feeling experience of drinking juice with a high degree of freshness, in contrast to the case of drinking extracted juice with vessels such as a drinking glass or the like.

PRIOR ART REFERENCES

Patent Documents

Patent Document 1: JP53-051365 U
Patent Document 2: JP57-004894 U
Patent Document 3: JP03-055010 U
Patent Document 4: JP04-170910 A
Patent Document 5: JP09-294672 A

SUMMARY OF THE INVENTION

Problems to be Solved by the Invention

However, regarding the juice extractors proposed in the above patent documents, a schematic concept is merely proposed, and thus, no specific consideration is made with respect to the structure or the like of the juice extractors. Accordingly, the above patent documents fail to propose the configuration of a juice extractor at a practical level.

The present invention has been made in order to solve the above problem and an object thereof is to provide a juice extractor, a juice extractor body and a flexible blade for such juice extractor, that can provide enjoyment to people when extracting juice from materials such as fruit, vegetables or the like and when drinking fruit juice or vegetable juice obtained by juice extraction, and that has a practical structure.

Means for Solving the Problems (1) A juice extractor body according to the present invention for solving the above problem, includes: a rotating shaft; a flexible blade, a longitudinal direction thereof being coincident with an axial direction of the rotating shaft, said flexible blade being arranged around the rotating shaft; and a blade guide provided at an intermediate position in the longitudinal direction, wherein one end in the longitudinal direction of the flexible blade is configured to be slidable in the axial direction of the rotating shaft, wherein the other end in the longitudinal direction of the flexible blade is attached to an axis member that extends from the blade guide to the other end side of the flexible blade or to the rotating shaft, and wherein the flexible blade changes from a form in which the flexible blade is linearly extended to a form in which the flexible blade is bent and outwardly expanded or vice versa, between the other end of the flexible blade and the blade guide, in association with the sliding of the one end of the flexible blade.

According to the present invention, since the juice extractor body is configured described as above, the flexible blade changes between the linearly extended form and the bent and outwardly expanded form. Since the flexible blade changes its form as described above, the flexible blade moves from the core position of a material, which is a target for juice extraction, to a position immediately close to the skin thereof on the inner side of the skin thereof. Accordingly, the juice extractor body performs juice extraction in a reliable and efficient manner on the inner side of the skin while leaving the skin behind. Consequently, enjoyment can be provided to those who perform the juice extraction work. In addition, since the remaining skin can be used as a vessel, enjoyment can also be provided to those who drink the obtained extracted juice.

In the juice extractor body according to the present invention, the length between the blade guide and the one end of the flexible blade is set in accordance with the size of a target to be juice-extracted.

According to the present invention, since the length between the blade guide and the one end of the flexible blade is set in accordance with the size of a target to be juice-extracted, the flexible blade bends into a form suitable for the target and can be outwardly expanded to a position immediately close to the skin. Thus, the target can be juice-extracted with no waste.

In the juice extractor body according to the present invention, a coupling mechanism that connects the other end of the flexible blade to the axis member or to the rotating shaft is included, wherein the coupling mechanism guides the other end side of the flexible blade to a closed form in which the other end is parallel to the axial direction of the rotating shaft and to an opened form in which the other end is opened outwardly in a radial direction of the rotating shaft, respectively.

According to the present invention, since the juice extractor body includes a coupling mechanism configured as described above, the degree of outward expansion of the flexible blade can be made small on the blade guide side and large on the other end side. It should be noted that a hole is pre-created in the skin of the target to be juice-extracted and the juice extractor body is inserted inside the target from such hole. Since the degree of expansion of the flexible blade is smaller on the blade guide side than the other end side in this juice extractor body, the hole in the skin is prevented from being damaged by the flexible blade.

In the juice extractor body according to the present invention, a blade slider is provided that moves the one end of the flexible blade in the axial direction of the rotating shaft.

According to the present invention, the one end of the flexible blade can be easily and smoothly slided in the axial direction of the rotating shaft. In particular, when the juice extractor body has a plurality of flexible blades, the ends of such plurality of flexible blades can be made to slide simultaneously by way of the blade slider holding together the ends of the plurality of flexible blades.

In the juice extractor body according to the present invention, the blade guide includes a guide hole through which the flexible blade is passed, wherein the guide hole is provided with a part outwardly widened in the radial direction of the rotating shaft on the other end side of the flexible blade.

According to the present invention, since the guide hole in the blade guide is configured as described above, the flexible blade bends along the outwardly widened part of the guide hole in the guide hole. Accordingly, the outwardly widened part allows the flexible blade to change forms smoothly.

In the juice extractor body according to the present invention, the flexible blade is configured with a material selected from a metal material which has flexibility, a plastic material, a carbon material and a composite material thereof.

(2) A juice extractor according to the present invention for solving the above problem, includes: a rotating shaft; a driving force transmission mechanism that has a shaft holder that removably holds the rotating shaft and transmits a driving force for rotating the rotating shaft; a flexible blade, a longitudinal direction thereof being coincident with an axial direction of the rotating shaft, said flexible blade being arranged around the rotating shaft; a blade guide provided at an intermediate position in the longitudinal direction; and a sliding mechanism for sliding one end in the longitudinal direction of the flexible blade in the axial direction of the rotating shaft, wherein one end in the longitudinal direction of the flexible blade is configured to be slidable the axial direction of the rotating shaft, wherein the other end in the longitudinal direction of the flexible blade is attached to an axis member that extends from the blade guide to the other end side of the flexible blade or to the rotating shaft, and wherein the flexible blade changes from a form in which the flexible blade is linearly extended to a form in which the flexible blade is bent and outwardly expanded or vice versa, between the other end of the flexible end and the blade guide, in association with the sliding of the one end of the flexible blade.

According to the present invention, since the juice extractor is configured as described above, the flexible blade changes between the linearly extended form and the bent and outwardly expanded form. Since the flexible blade changes its form as described above, the flexible blade moves from the core position of a material, which is a target for juice extraction, to a position immediately close to the skin thereof on the inner side of the skin thereof. Accordingly, the juice extractor body performs juice extraction in a reliable and efficient manner on the inner side of the skin while leaving the skin behind. Consequently, enjoyment can be provided to those who perform the juice extraction work. In addition, since the remaining skin can be used as a vessel, enjoyment can also be provided to those who drink the obtained extracted juice. Moreover, since the configuration of the juice extractor body is specific, a practicable juice extractor an be provided. Further, since the shaft holder allows the rotating shaft to be removable, appropriate selection and change of a flexible blade can be easily made in accordance with a material.

In the juice extractor according to the present invention, a coupling mechanism that connects the other end of the flexible blade to the axis member or to the rotating shaft is included, wherein the coupling mechanism guides the other end of the flexible blade to a closed form in which the other end is parallel to the axial direction of the rotating shaft and to an opened form in which the other end is opened outwardly in a radial direction of the rotating shaft, respectively.

According to the present invention, since the juice extractor includes a coupling mechanism configured as described above, the degree of outward expansion of the flexible blade can be made small on the blade guide side and large on the other end side. It should be noted that a hole is pre-created in the skin of the target to be juice-extracted and the juice extractor body is inserted inside the target from such hole. Since the degree of expansion of the flexible blade is smaller on the blade guide side than the other end side in this juice extractor body, the hole in the skin is prevented from being damaged by the flexible blade.

In the juice extractor according to the present invention, a blade slider is included that moves the one end of the flexible blade in the axial direction of the rotating shaft.

According to the present invention, the one end of the flexible blade can be easily and smoothly slided in the axial direction of the rotating shaft. In particular, when the juice extractor body has a plurality of flexible blades, the ends of such plurality of flexible blades can be made to slide simultaneously by way of the blade slider holding together the ends of the plurality of flexible blades.

(3) A flexible blade for a juice extractor according to the present invention for solving the above problem, is made of a titanium alloy with a tensile elastic limit strength, which is defined as a stress when a permanent strain in a tensile test reaches 0.2%, of 700 MPa or higher and with an average Young's modulus, which is determined as a slope of a tangent at a stress position corresponding to ½ of the tensile elastic limit strength in a stress-strain diagram obtained from the tensile test, of 100 GPa or lower.

According to the present invention, even when the flexible blade is largely bent, it is still possible to let the flexible blade perform excellent elastic deformation, and plastic deformation of the flexible blade can still be prevented. In addition, since the flexible blade is configured with the titanium alloy described above, the strength of the flexible blade can be increased and the durability of the flexible blade can also be increased. Further, since the Young's modulus of the flexible blade is low, bending stress can be made small. Thus, even when a load is repeatedly applied to the flexible blade in a largely-bent form, such flexible blade can be used over a long period of time in good condition. Moreover, since the flexible blade is configured by a titanium alloy, a passive state coating (titanic oxide coating) is formed on the surface of the flexible blade and thus, the flexible blade excels in corrosion resistance.

Effect of the Invention

According to the juice extractor, juice extractor body and flexible blade for such juice extractor according to the present invention, enjoyment can be provided to people when extracting juice from fruit or the like and when drinking fruit juice obtained by juice extraction; and the structures of such juice extractor, juice extractor body and flexible blade for such juice extractor are simple and can be put into practical use.

BRIEF DESCRIPTIONS OF THE DRAWINGS

Figure 6:
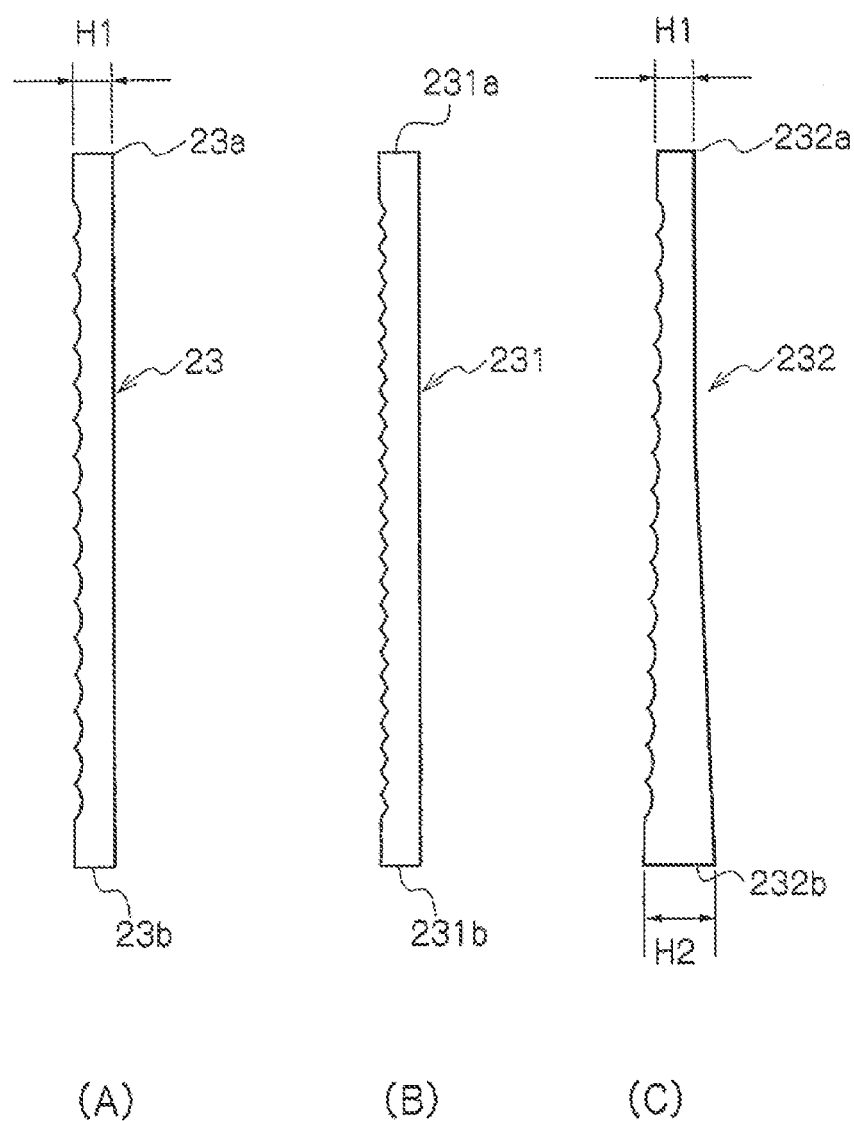

FIG. 6 contains side views of flexible blades, wherein (A) shows a flexible blade with a constant width, (B) shows a flexible blade with a saw teeth form different from that of (A), and (C) shows a flexible blade with a width varying in a longitudinal direction.

Figure 7:
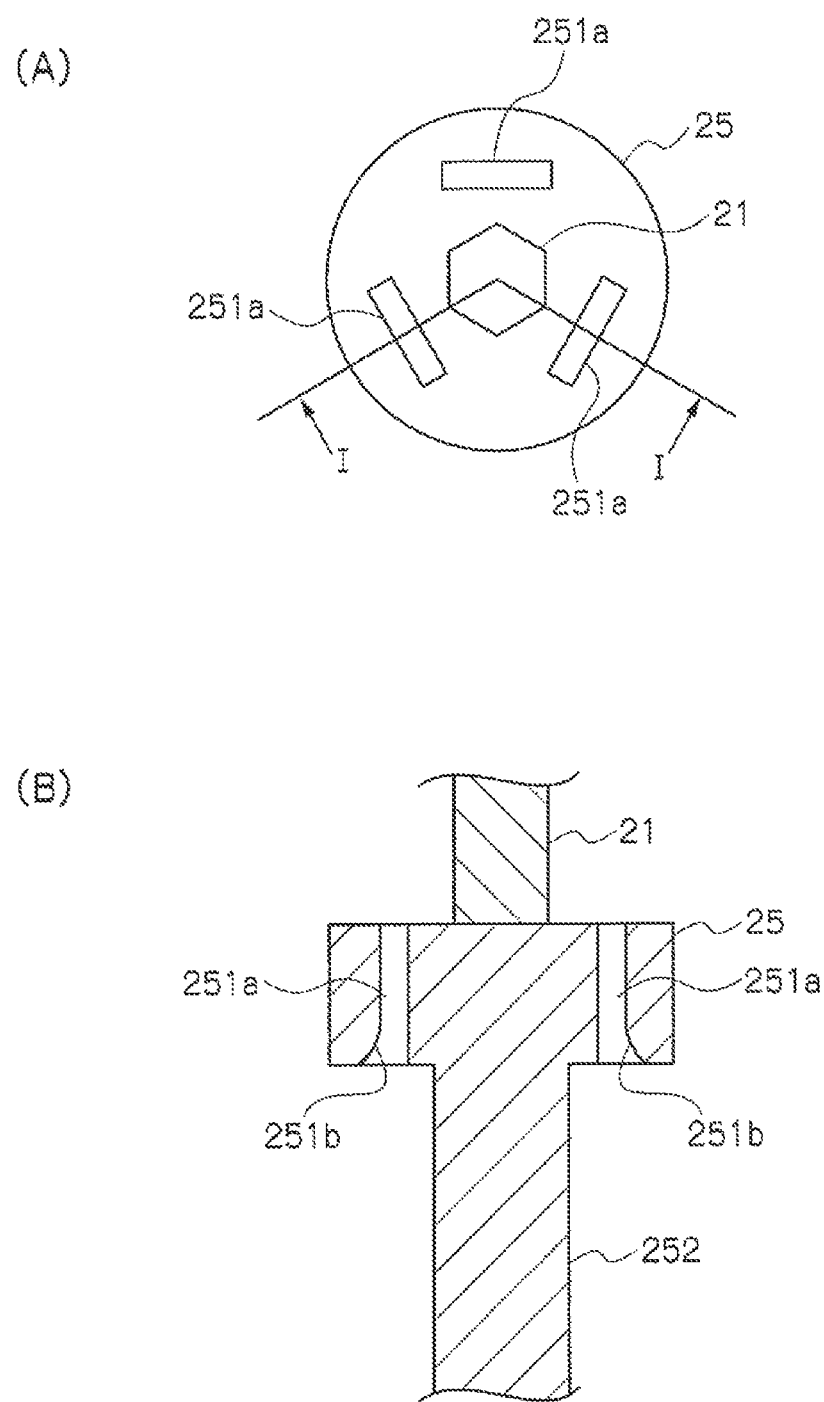

FIG. 7 contains explanatory diagrams for illustrating a structure of a blade guide, wherein (A) shows an upper surface of a blade guide and (B) shows the I-I cross-section of (A).

Figure 8:
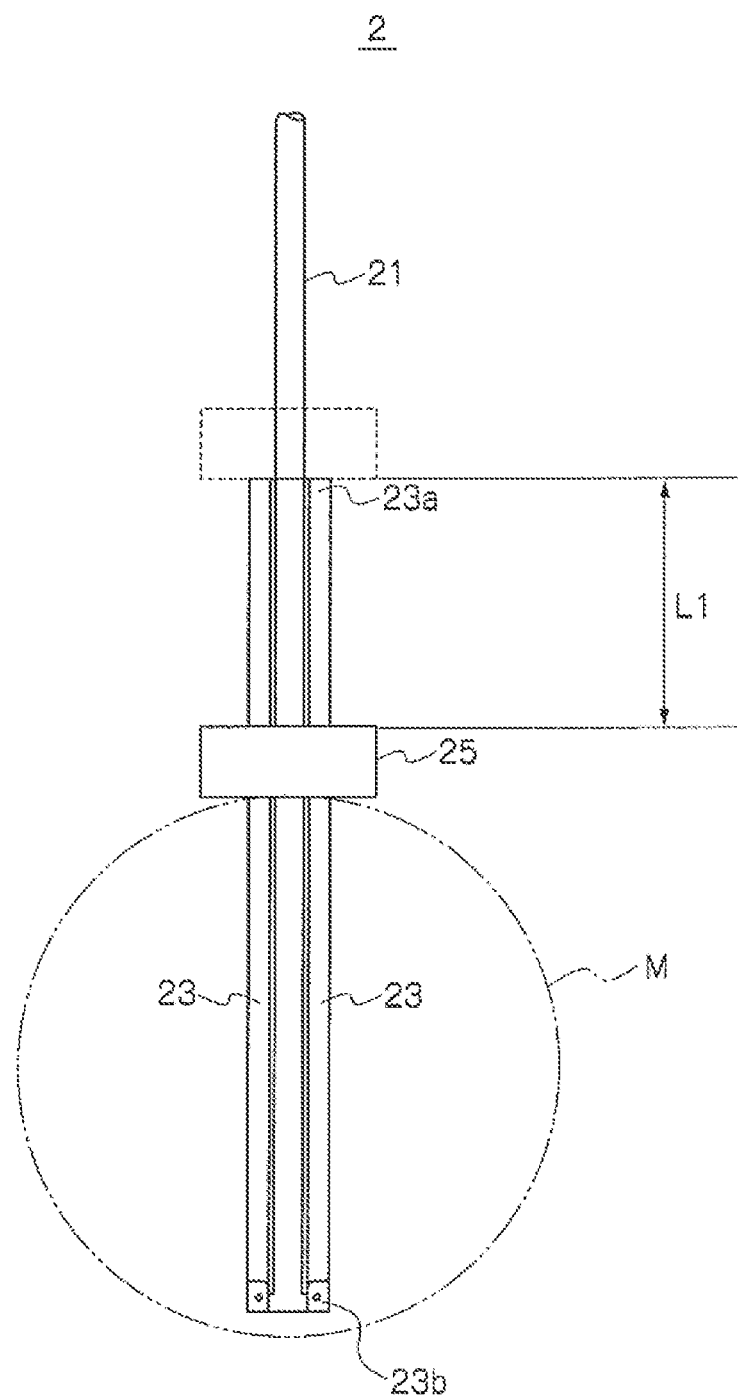

FIG. 8 is an explanatory diagram for illustrating a distance over which one end of a flexible blade of a juice extractor body according to the present invention slides.

Figure 9:
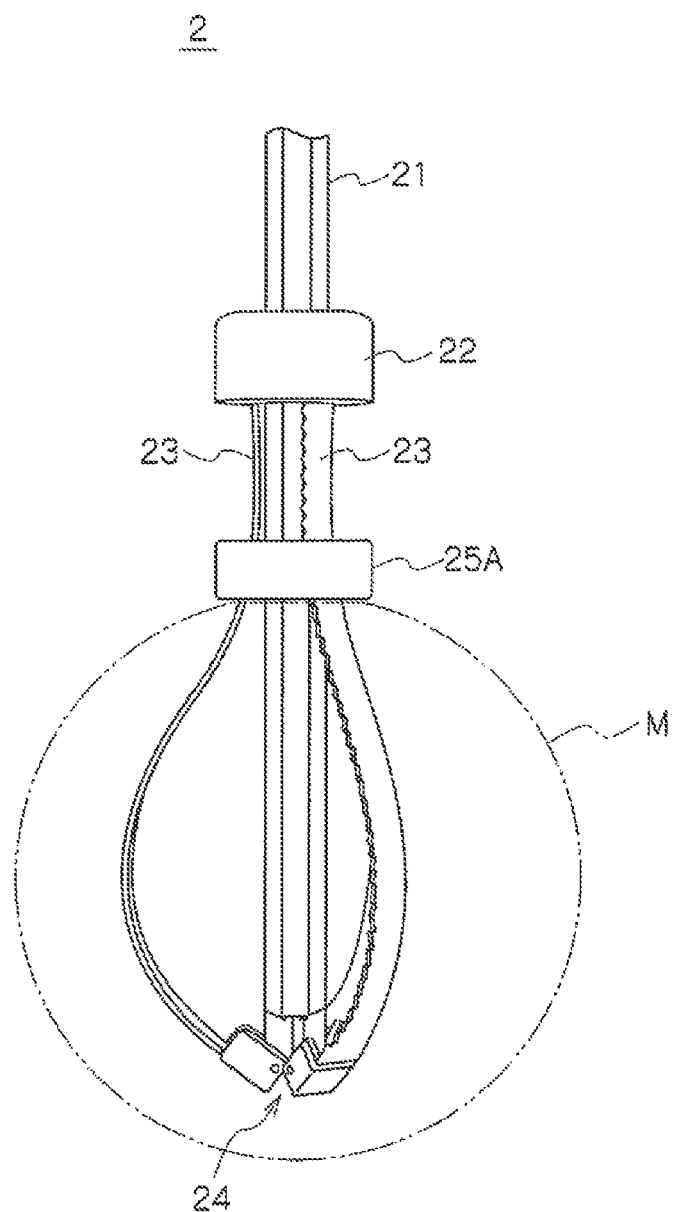

FIG. 9 is a perspective view of a juice extractor body provided with a blade guide having a form different from that of the blade guide shown in FIG. 7.

Figure 10:
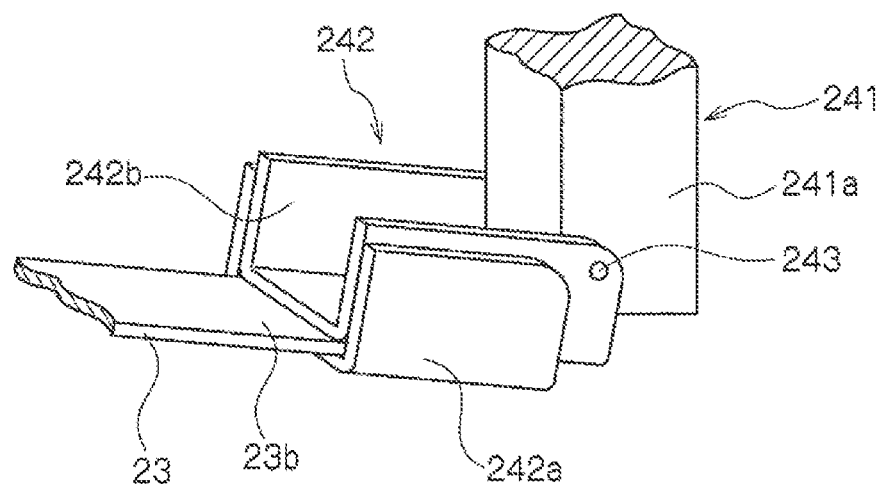

FIG. 10 is a perspective view partially illustrating a coupling mechanism.

Figure 11:
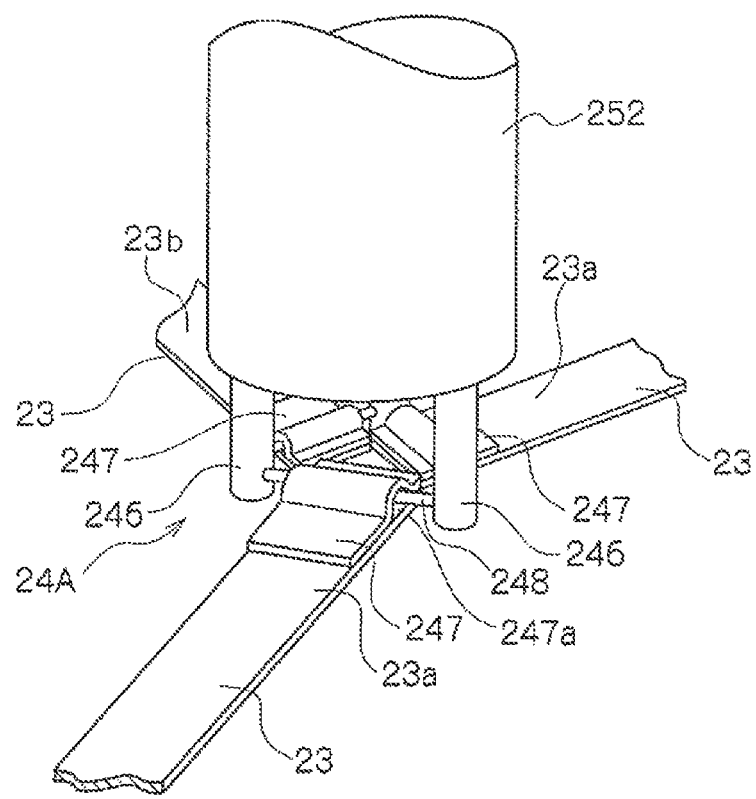

FIG. 11 is a perspective view illustrating a coupling mechanism having a form different from that of FIG. 10.

Figure 12:
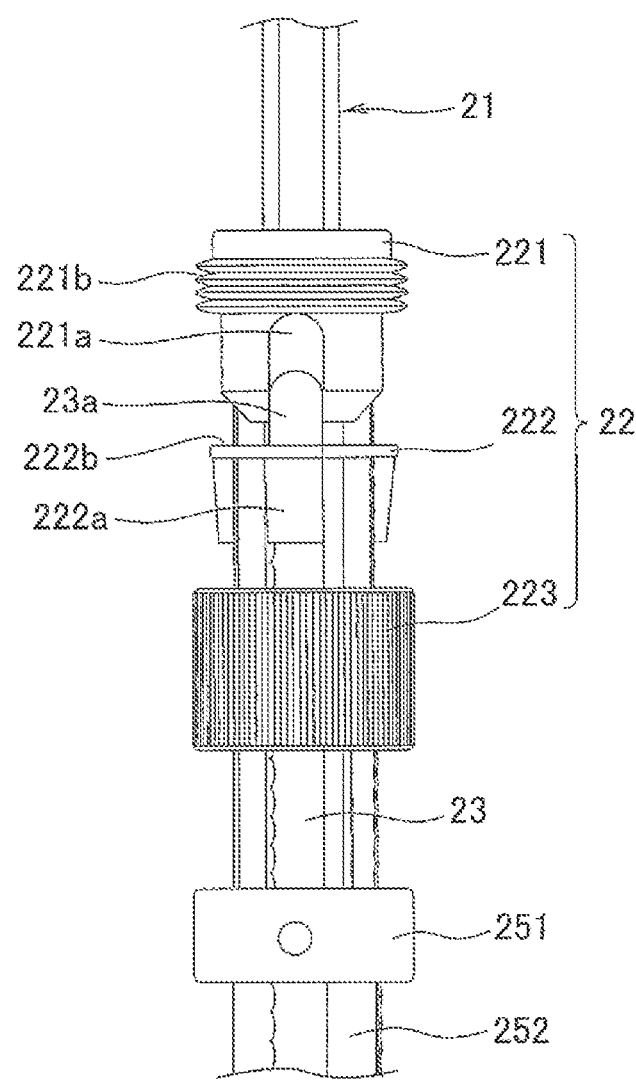

FIG. 12 is an explanatory diagram in which a blade slider is disassembled in order to illustrate the blade slider.

Figure 13:
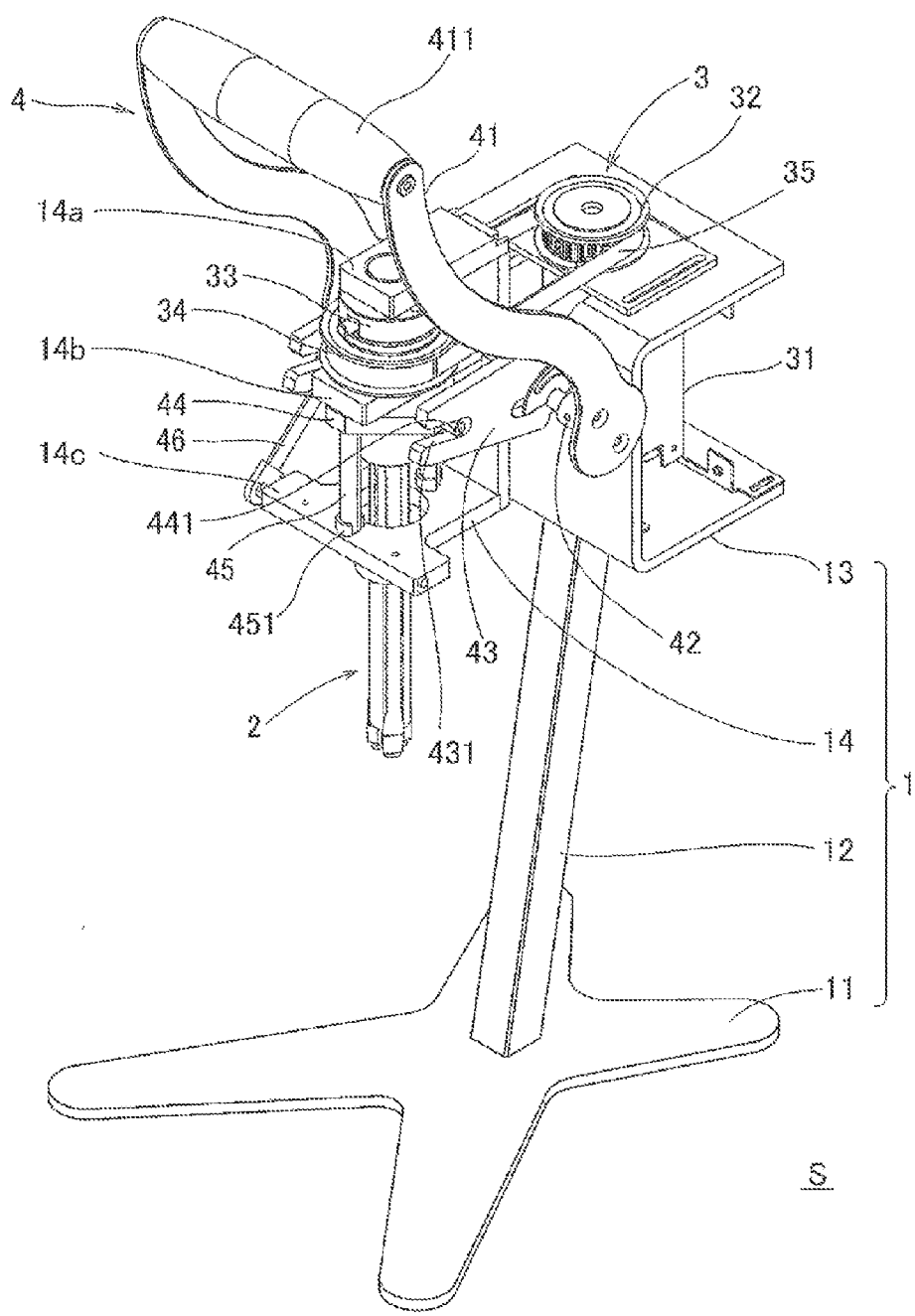

FIG. 13 is a perspective view showing the entire structure of one embodiment of a juice extractor according to the present invention.

Figure 14:
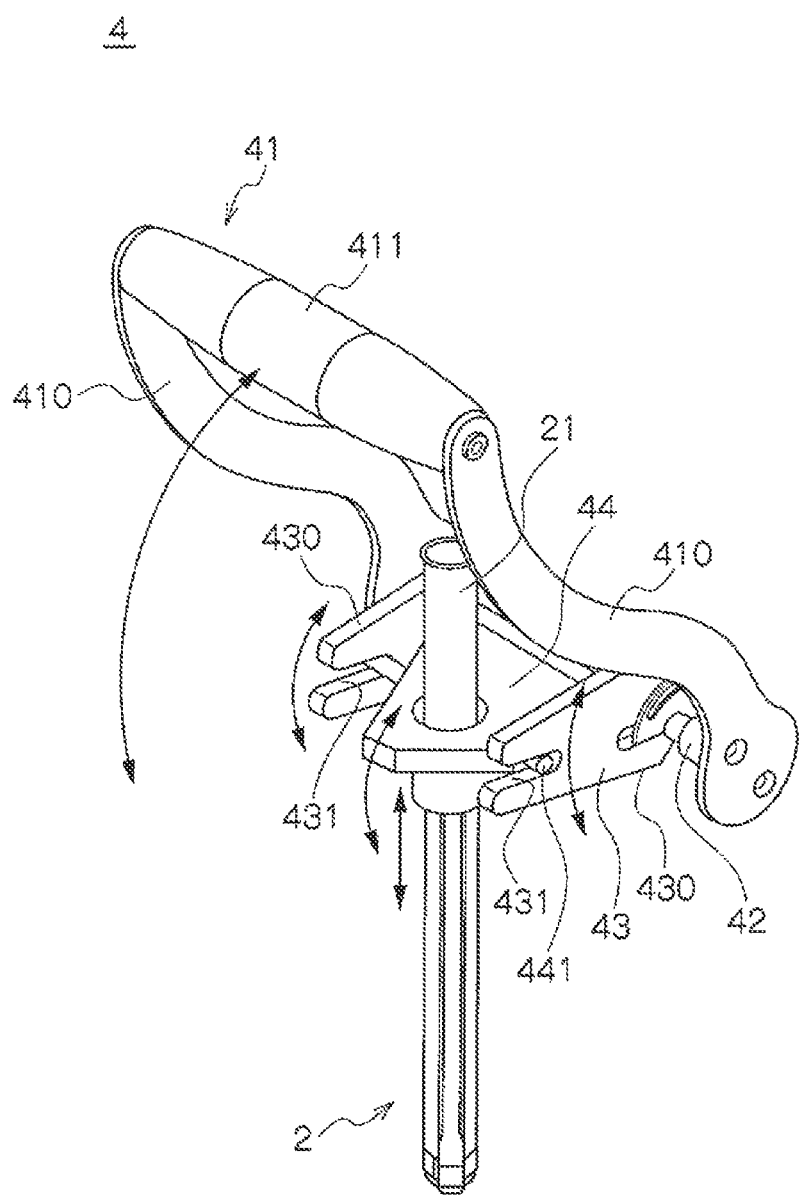

FIG. 14 is a perspective view of a sliding mechanism provided to a juice extractor.

Figure 15:
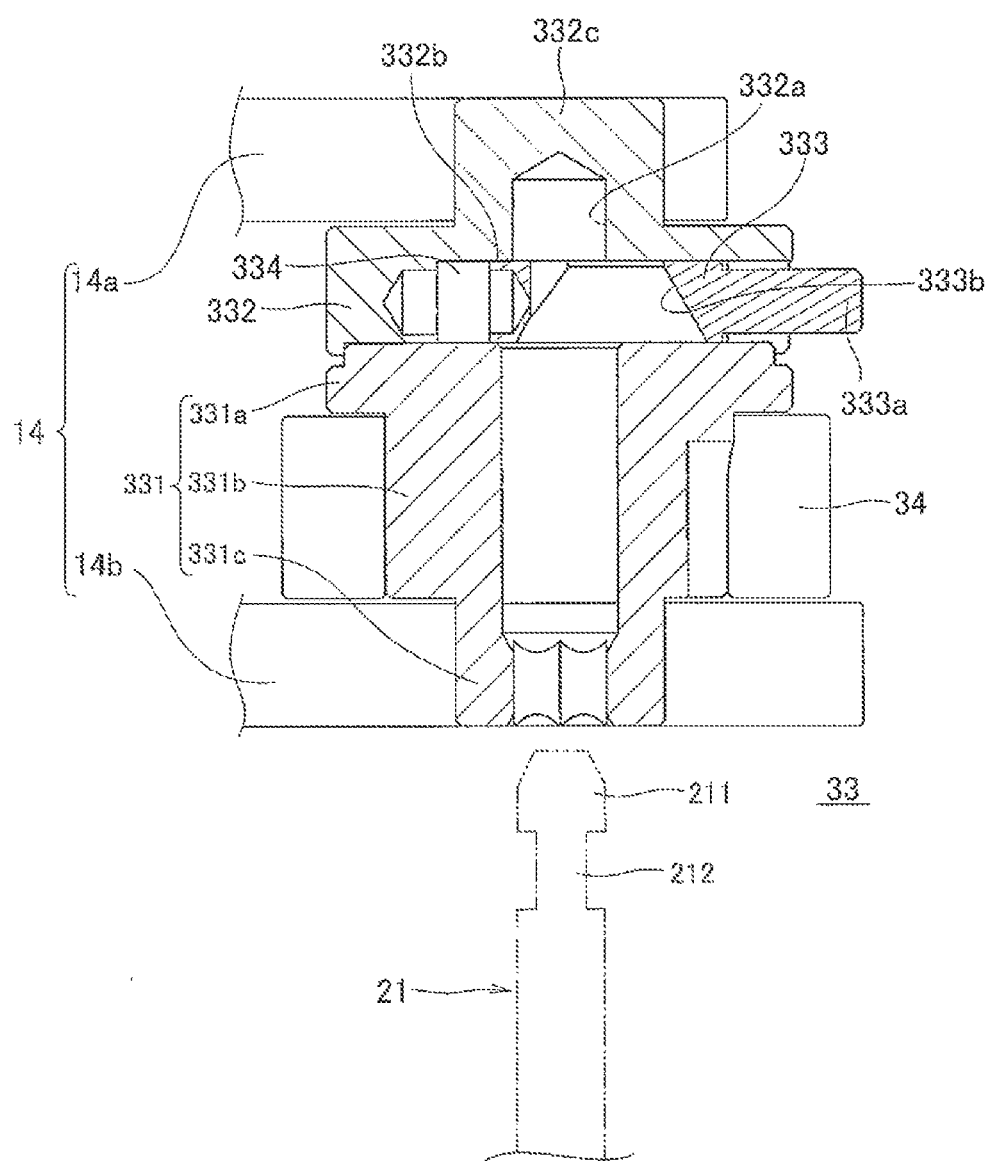

FIG. 15 is a cross-sectional view of a shaft holder provided to a juice extractor.

Figure 16:
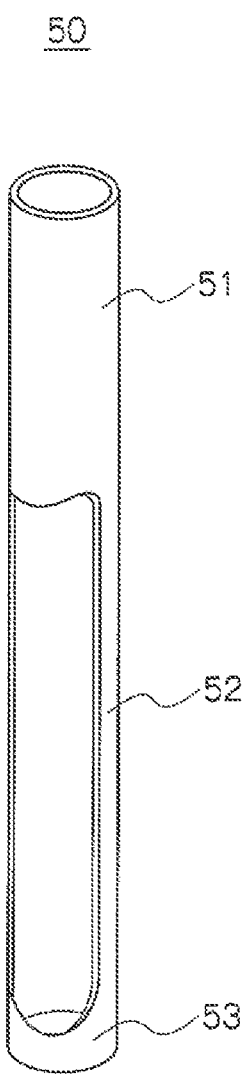

FIG. 16 is a perspective view of one embodiment of a core removal tool.

Figure 17:
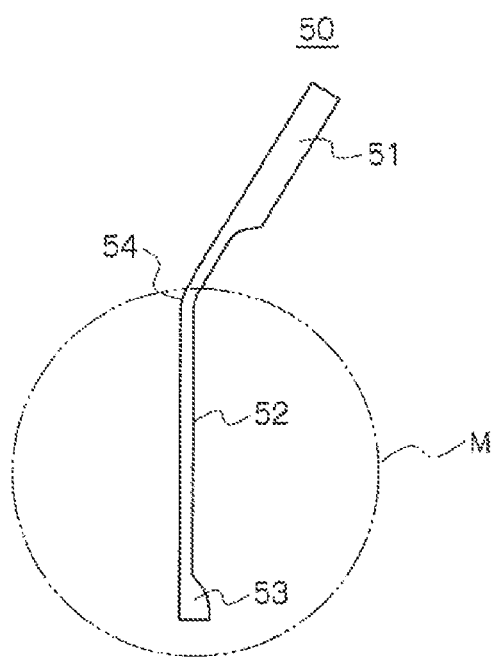
Figure 17:
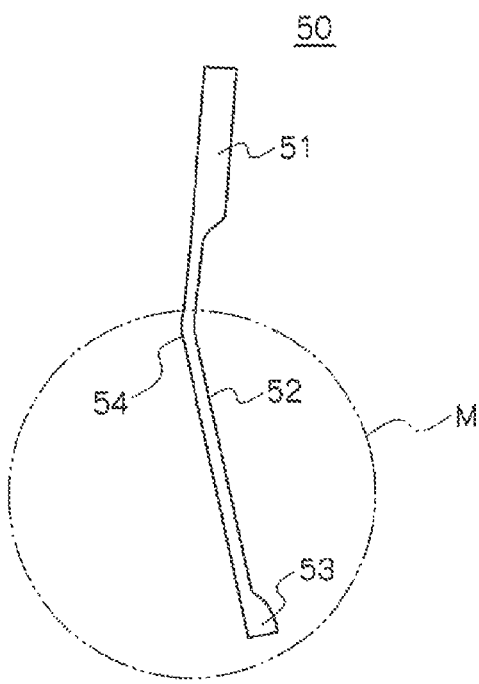

FIG. 17 contains explanatory diagrams of a core removal tool having a bend part, wherein (A) shows a core removal tool inserted at a position of a core of a fruit or the like, and (B) shows a core being separated from the fruit.

Figure 18:
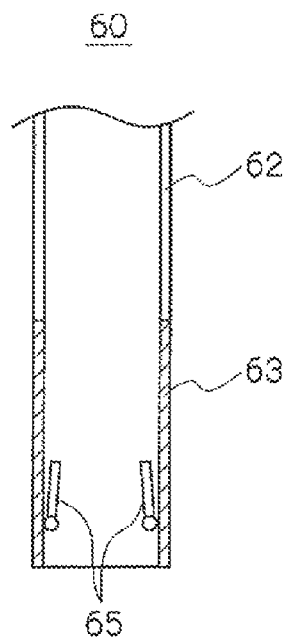
Figure 18:
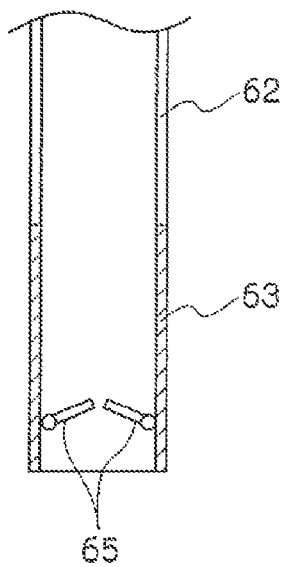

FIG. 18 contains partial cross-sectional views of a core removal tool having a different structure, wherein (A) shows a catching piece in a closed form and (B) shows a catching piece in an opened form.

Figure 19:
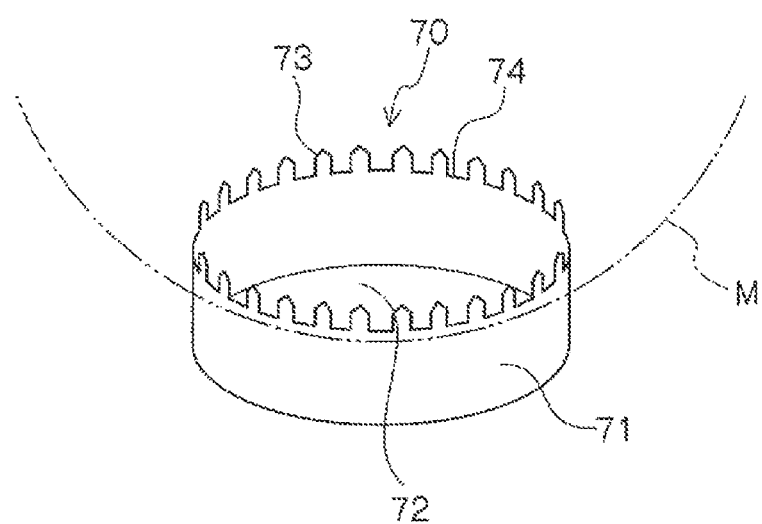

FIG. 19 is a perspective view of a receiving vessel.

Figure 20:
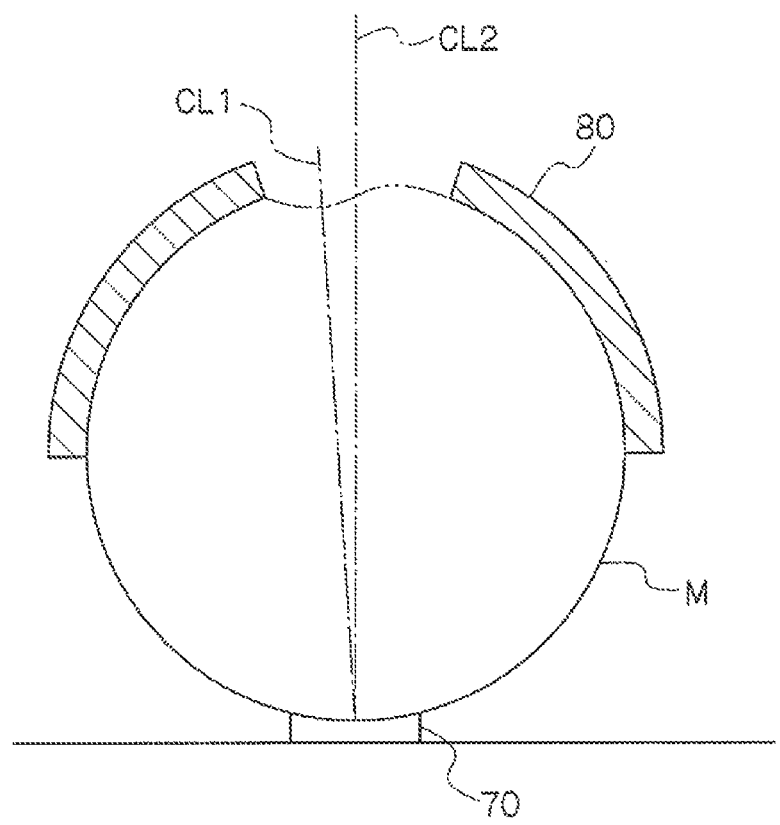

FIG. 20 is an explanatory view for illustrating the situation in which a core of a material is tilted and set in a juice extractor.

Figure 21:
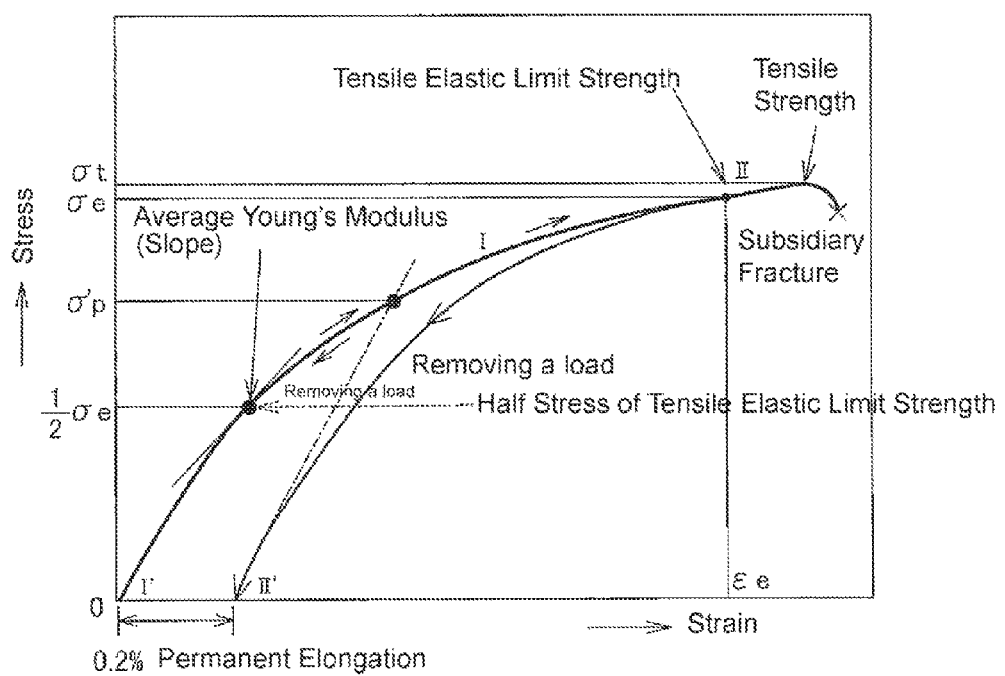

FIG. 21 is a graph that is schematically showing a stress-strain diagram of a blade guide.

EMBODIMENTS OF THE INVENTION

Hereinafter, embodiments of the present invention will be described with reference to the drawings. It should be noted that the technical scope of the present invention is not limited to only the following description or drawings. In addition, it is possible to add one, two or more elements arbitrarily selected from the technical matters described in the present specification to the above-described elements of the present invention. The content described in the present specification will be applied to a juice extractor body, a juice extractor and a flexible blade for such juice extractor according to the present invention. It will also be applied to a juice extraction method using such juice extractor body, juice extractor and flexible blade for such juice extractor.

[Basic Configuration and Basic Principle of Juice Extractor Body]

Figure 1:
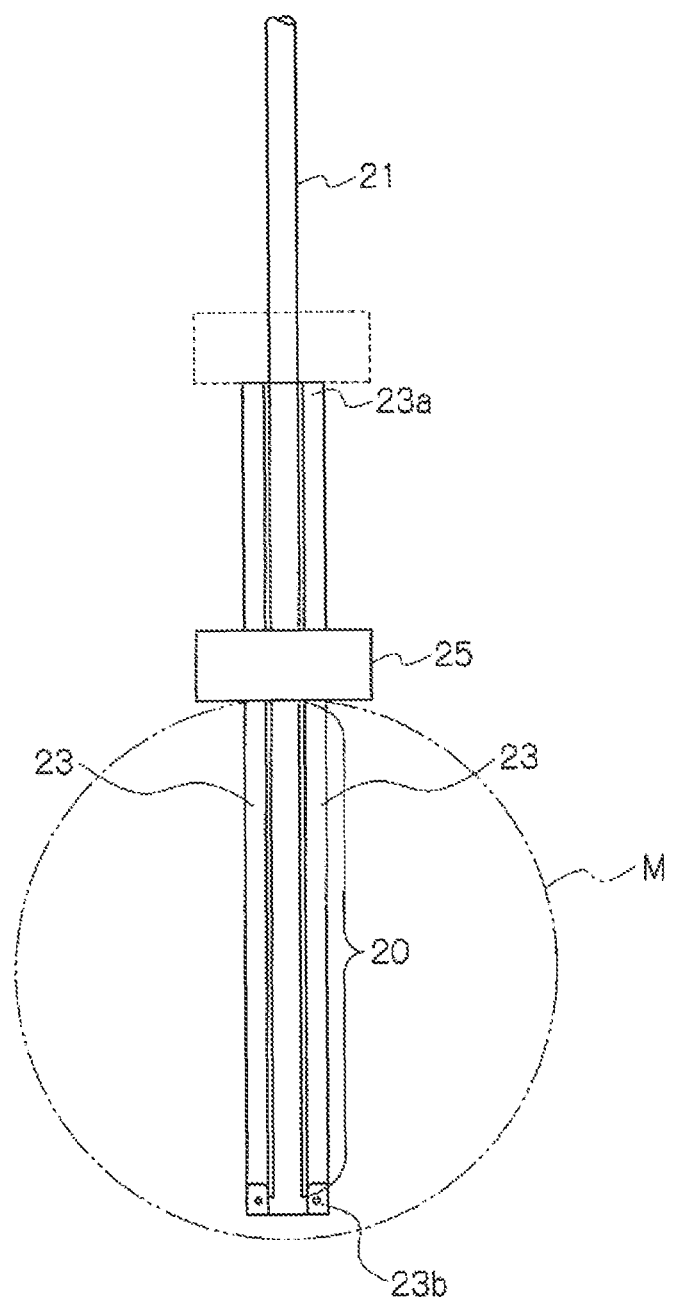
FIG. 1 is an explanatory diagram schematically showing a juice extractor body according to the present invention, wherein a flexible blade is linearly extended (i.e. diameter-reduced form).
Figure 2:
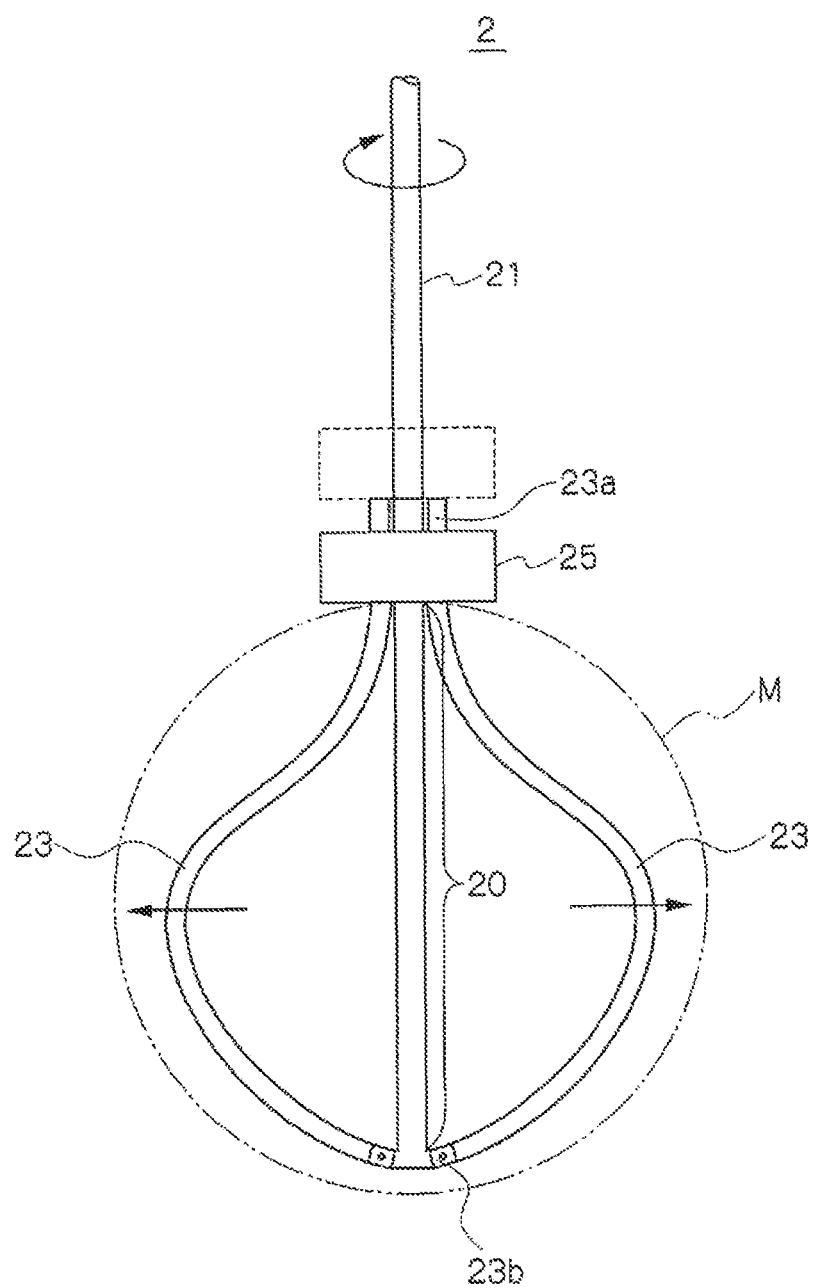
FIG. 2 is an explanatory diagram schematically showing a juice extractor body according to the present invention, wherein a flexible blade is bent and expanded (i.e. diameter-expanded form).

As shown in FIGS. 1 and 2, juice extractor body 2 according to the present invention is provided with: rotating shaft 21; flexible blade 23 arranged around rotating shaft 21 with a longitudinal direction thereof being coincident with an axial direction of rotating shaft 21; and blade guide 25 provided at an intermediate position of the longitudinal direction of flexible blade 23. One end 23a in the longitudinal direction of flexible blade 23 is configured to be slidable in the axial direction of rotating shaft 21. In contrast, the other end 23b in the longitudinal direction of the flexible blade is coupled to axis member 252 (See FIGS. 3 to 5), which extends from blade guide 25 to the other end 23b side of flexible blade 23, or to rotating shaft 21.

The form of flexible blade 23 changes, between the other end 23b of flexible blade 23 and blade guide 25, from the linearly extended form (i.e. diameter-reduced form) shown in FIG. 1 to the bent and outwardly expanded form (i.e. diameter-expanded form) shown in FIG. 2 or vice versa, in association with sliding of one end 23a of flexible blade 23.

It should be noted that FIGS. 1 and 2 show an example in which juice extractor body 2 has two flexible blades 23. However, juice extractor body 2 may be configured with one flexible blade 23 or with three or more flexible blades 23. In addition, in FIGS. 1 and 2, member 20 extends from blade guide 25 to the other end 23b of flexible blade 23. Such member 20 may be configured with rotating shaft 21 or an axis member (i.e. the member denoted by reference numeral 252 in FIGS. 3 to 5) that extends from blade guide 25 to the other end side of the flexible blade.

Juice extractor body 2 extracts juice from material M, such as fruit or the like, which is a target to be juice-extracted (hereinafter such juice Material M may also simply be referred to as "material M"). As shown in FIG. 1, a part of juice extractor body 2 between a tip of juice extractor body 2 (the lower end of juice extractor body 2 shown in FIG. 1) and blade guide 25 is inserted at a core position of material M, with flexible blade 23 being in a linearly extended form. Thereafter, as shown in FIG. 2, one end 23a of flexible blade 23 slides to the side of the blade guide 25.

By one end 23a of flexible blade 23 sliding flexible blade 23 assumes a bent and outwardly expanded form in an area thereof between blade guide 25 and the other end 23b (the tip of juice extractor body 2).

In addition, juice extractor body 2 is rotated with flexible blade 23 being expanded as shown in FIG. 2, a skin of material M is left as is and juice is extracted from within the skin. Subsequently, one end 23a of flexible blade 23 slides in a direction away from blade guide 25. As a result, flexible blade 23 restores to a linearly extended form between blade guide 25 and the other end 23b as shown in FIG. 1.

Due to a change in form of flexible blade 23 as described above, flexible blade 23 moves, on the inner side of the skin, from a position of the core of material M to a position immediately close to the skin. Thus, juice extractor body 2 performs juice extraction, in a reliable and efficient manner, on the inner side of the skin, while leaving the skin of material M behind. As a result, a special effect is achieved to the effect that juice extractor body 2 can be provided, which can provide enjoyment to people when extracting juice from material M or when drinking extracted juice or the like, and which has a practical structure.

It should be noted that the extracted juice obtained from the material in the present specification includes, in addition to liquid, semifluid (semisolid) in a sherbet form or a granular solid.

[Specific Configuration of Juice Extractor Body]

The specific configuration of juice extractor body 2 having the above basic configuration will be described with reference to FIGS. 3 to 12. Juice extractor body 2 includes: rotating shaft 21; flexible blade 23 arranged in an area around rotating shaft 21; blade guide 25 arranged at an intermediate part in a longitudinal direction of the flexible blade; blade slider 22 that slides one end 23a (i.e. the upper end part of flexible blade 23 shown in FIGS. 3 to 5) of flexible blade 23 in an axial direction of rotating shaft 23; and coupling mechanism 24 that couples the other end 23b of flexible blade 23 to axis member 252 or rotating shaft 21.

(Rotating Shaft)

The cross-sectional shape of rotating shaft 21 is formed into a hexagon. The upper part of rotating shaft 21 is held by shaft holder 33 (see FIG. 15) provided to juice extractor S. The upper part of rotating shaft 21 is configured with small diameter part 212 having a narrow external diameter and head part 211 above small diameter part 212. It should be noted that the cross-sectional shape of rotating shaft 21 is not limited to a hexagonal shape and it may be formed into a polygonal shape, other than a hexagon, such as a square or the like. In addition, the cross-section of rotating shaft 21 may be circular.

(Flexible Blade)

Figure 3:
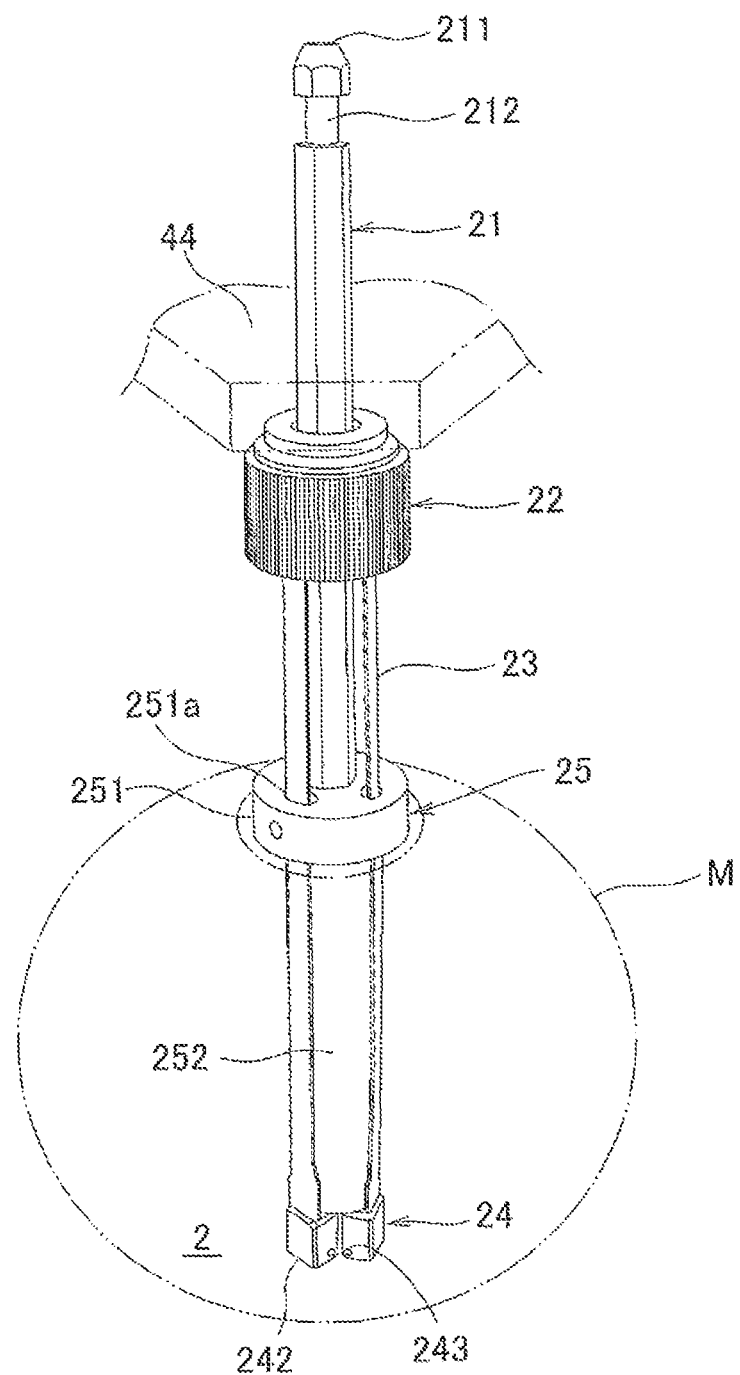
FIG. 3 is a perspective view of a juice extractor body, wherein a flexible blade is linearly extended (i.e. diameter-reduced form).
Figure 4:
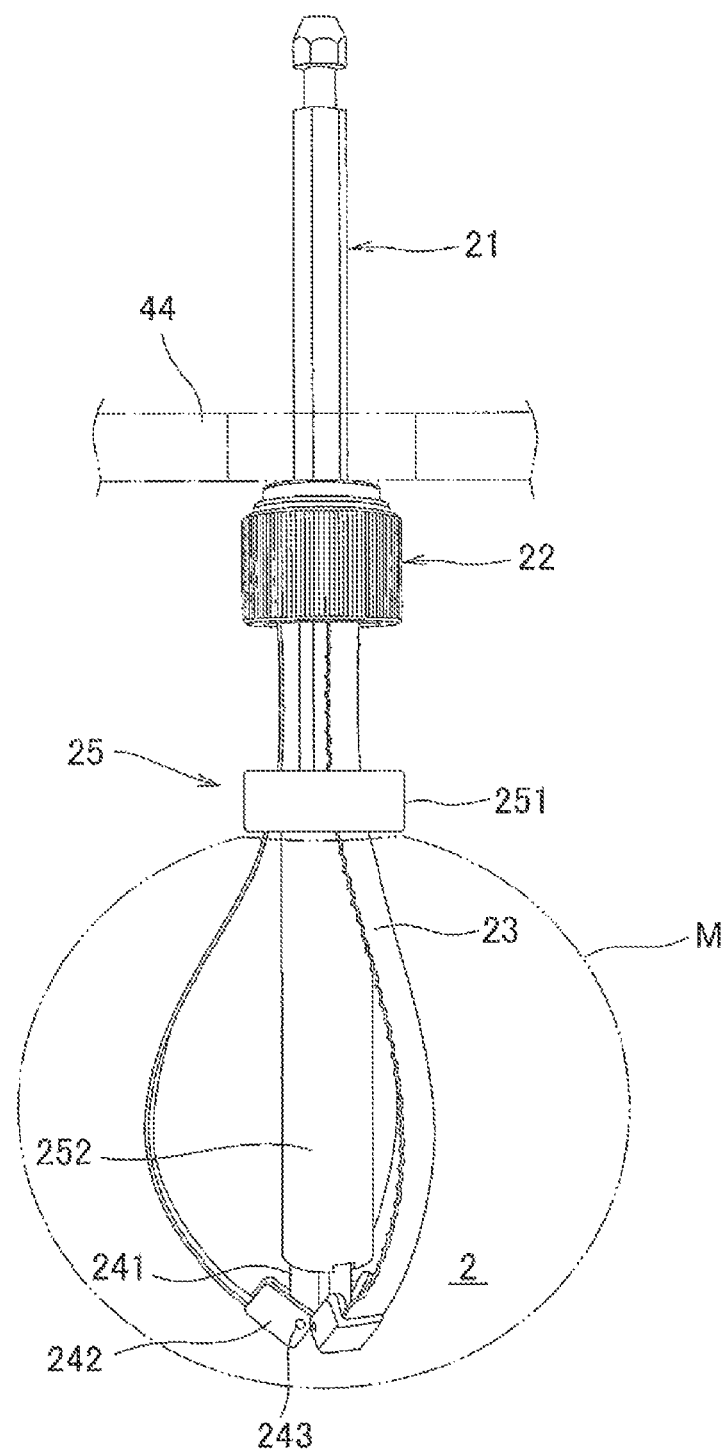
FIG. 4 is a perspective view of a juice extractor body, wherein a flexible blade is in the process of being bent and expanded.
Figure 5:
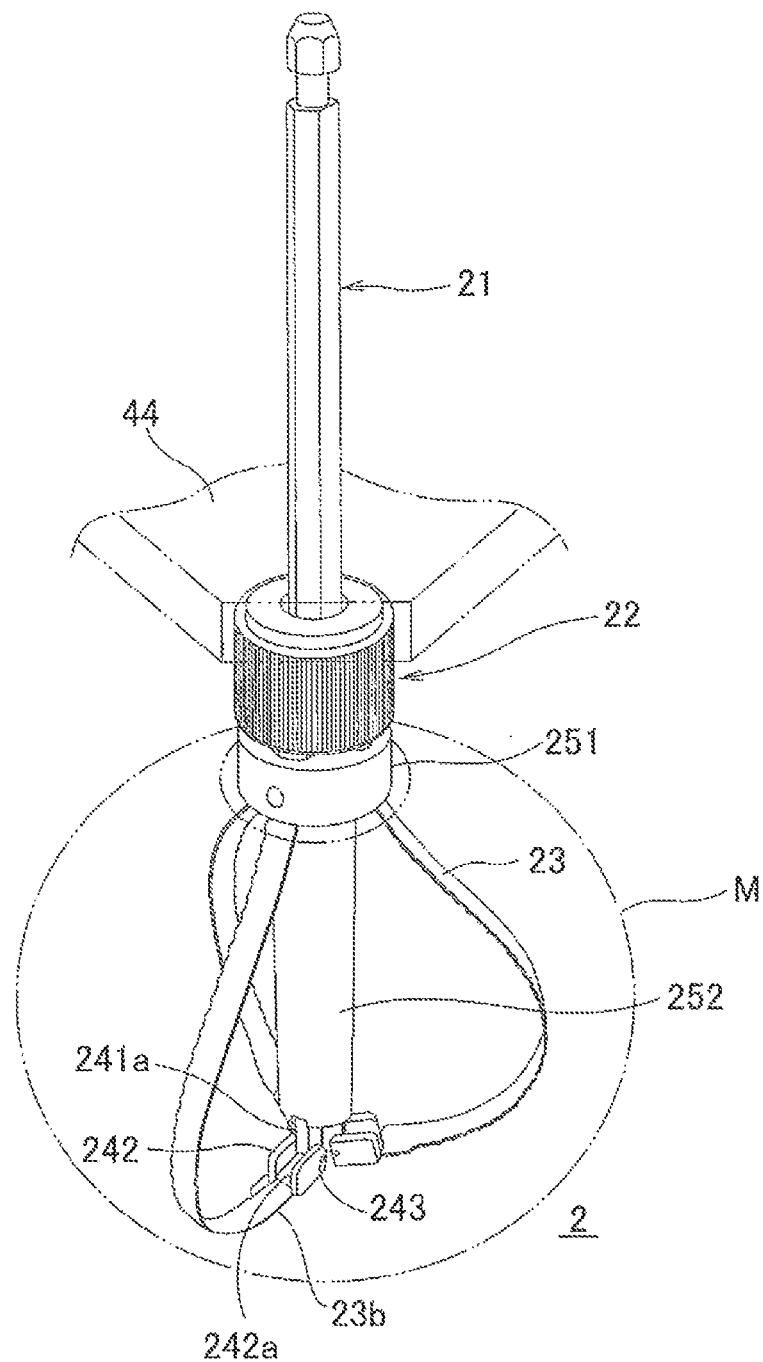
FIG. 5 is a perspective view of a juice extractor body, wherein a flexible blade is bent and expanded to the maximum (i.e. diameter-expanded form).

In the example shown in FIGS. 3 to 5, three flexible blades 23 are used. Three flexible blades 23 are arranged around rotating shaft 21 in a circumferential direction at regular intervals. It should further be noted that the present invention is not limited to the use of three flexible blades 23 and one, two or four or more flexible blades may alternatively be used.

As shown in FIG. 6(A), each flexible blade 23 is formed in a belt form. Width H1 of each flexible blade 23 is constant over the entire area in the longitudinal direction. One end 23a in the longitudinal direction of flexible blade 23 is held by blade slider 22. The other end 23b in the longitudinal direction is coupled to coupling mechanism 24. One side edge of flexible blade 23 is formed with saw teeth for ease of juice extraction within material M. Trough parts of the saw teeth have a circular arc form. The saw teeth are formed in the side edge that forms a front part side in a rotational direction when juice extractor body 2 is rotated.

Flexible blade 231 may also be configured as shown in FIG. 6(B). Flexible blade 231 has a belt form. Width H1 of flexible blade 231 is also constant over the entire area in the longitudinal direction. In flexible blade 231, trough parts of the saw teeth formed on one side edge have a linear form.

Flexible blade 23 is not limited in terms of material as long as it is a material with flexibility. For example, it may be configured with a material selected from a metal material, a plastic material, a carbon material and a composite material thereof. It should be noted that repetitive stress occurs in the flexible blade. For this reason, flexible blade 23 is preferably a material with durability.

In this juice extractor body 2, a later-described coupling mechanism 24 bends the other end 23b side of flexible blade 23 more than one end 23a thereof. The bending stress increases as the degree of bending of flexible blade 23 increases. Thus, the bending stress is larger at the other end 23b side than the one end 23a side of flexible blade 23. For example, the flexible blade my be formed into the shape shown in FIG. 6(C) in order to reduce the bending stress that occurs in the flexible blade. The width of flexible blade 232 shown in FIG. 6(C) gradually widens to the other end 232b side in the area on the other end 232b side from the middle in the longitudinal direction thereof. Thus, in flexible blade 232, the bending stress becomes lower in the area on the other end 232b side than the middle in the longitudinal direction thereof. In addition, in this flexible blade 232, the degree of bending of flexible blade 232 may be made small at the part where the width widens. Thus, flexible blade 232 bends into a shape relatively close to an arc. Consequently, this flexible blade 232 efficiently extracts juice on the inner side of the skin.

(Blade Guide)

Blade guide 25 sets an area of flexible blade 23 to be bent. Blade guide 25 has a cylindrical form. Blade guide 25 is provided at the intermediate part in the longitudinal direction of flexible blade 23. In the example shown in FIGS. 3 to 5, blade guide 25 is attached to a lower end of rotating shaft 21. In addition, blade guide 25 is provided with axis member 252 which extends from an under surface thereof to the other end 23b side of flexible blade 23 (downward in FIGS. 3 to 5). Blade guide 25 and axis member 252 are configured as a single member. The central axis of axis member 252 and the central axis of rotating shaft 21 are provided on the same straight line and are in line with each other.

As shown in FIG. 7, blade guide 25 is provided with three guide holes 251a. Guide hole 251a is a hole for passing flexible blade 23 therethrough. Three guide holes 251a are provided around rotating shaft 21 attached to blade guide 25. As shown in FIG. 7(A), three guide holes 251a are arranged in a circumferential direction at regular intervals. Each guide hole 251a penetrates through blade guide 25 in the height direction thereof. It should be noted that the number of guide holes 251a corresponds to the number of flexible blades 23 used.

In addition, as shown in FIG. 7(B), guide hole 251a is provided with part 251b that outwardly widens in a radial direction of rotating shaft 21 on the other end 23b side of flexible blade 23. Outwardly widened part 251b is configured with a curved surface. The curved surface that forms outwardly widened part 251b is formed such that an outer wall surface of guide hole 251a gradually widens to the other end 23b side of flexible blade 23. Outwardly widened part 251b serves to outwardly expand flexible blade 23 in a smooth manner. It should be noted that outwardly widened part 251b is not limited to forming the outer wall surface of guide hole 251a with a curved surface. Outwardly widened part 251b may also be provided by inclining the outer wall surface of guide hole 251a outwardly in a straight manner and by forming a taper on the other end 23b side of flexible blade 23.

It should be noted that outwardly widened part 251b and a part on one end 23a side of the linearly-extending flexible blade 23 may be connected, at a boundary therebetween, with an R face (curved surface). When outwardly widened part 251b and the part on one end 23a side of the linearly-extending flexible blade 23 are connected with an R face, when flexible blade 23 restores to the linearly extended form from the bent and outwardly expanded form, flexible blade 23 can smoothly restore to the linearly extended form without being caught at the boundary inside guide hole 251a.

Length L1 between blade guide 25 and one end 23a of flexible blade 23 is, as shown in FIG. 8, set in accordance with the size of material M. The degree of bending and outward expansion of flexible blade 23 in the area between blade guide 25 and the other end 23b is proportional to the length over which one end 23a of flexible blade 23 slides. Namely, when the length over which one end 23a of flexible blade 23 slides is long, the degree of bending and outward expansion of flexible blade 23 is large. On the other hand, when the length over which one end 23a of flexible blade 23 slides is short, the degree of bending and outward expansion of flexible blade 23 is small. Utilizing this principle, when extracting juice from material M with a relatively large diameter, length L1 between one end 23a of flexible blade 23 and blade guide 25 may be set relatively long. On the other hand, when extracting juice from material M with relatively small diameter, length L1 between one end 23a of flexible blade 23 and blade guide 25 may be set relatively short.

The blade guide may be provided, as blade guide 25A shown in FIG. 9, by fixing a cylindrical member at an intermediate part e axial direction of rotating shaft 21. When blade guide 25A is configured by fixing a cylindrical member at an intermediate part in the axial direction of rotating shaft 21 as shown in FIG. 9, the below-described coupling mechanism 24 will be provided by fixing it directly to the tip of rotating shaft 21.

(Coupling Mechanism)

Coupling mechanism 24 couples the other end 23b of flexible blade 23 to axis member 252. Coupling mechanism 24 guides the other end 23b side of flexible blade 23 to a closed form in which the outer end is parallel to the axial direction of rotating shaft 21 and to an opened form in which the outer end is opened outwardly in the radial direction of rotating shaft 21, respectively.

FIGS. 3 to 5 show one example of coupling mechanism 24. Coupling mechanism 24 is attached to the tip of axis member 252. Coupling mechanism 24 couples the other ends 23b of flexible blades 23 to axis member 252. Coupling mechanism 24 is configured with: core 241 having three protrusions 241a radially protruding from the tip of axis member 252; three movable pieces 242 that hold the other ends 23b of flexible blades 23; and three supporting pin 243 that rotatably supports each movable piece 242 with respect to core 241. It should be noted that the number of protrusions 241a and the number of movable pieces 242 are set in accordance with the number of flexible blades 23.

Core 241 is fixed to the tip of axis member 252 of blade guide 25. Three protrusions 241a that configure core 241 are arranged around blade guide 25 in a circumferential direction at regular intervals. Each protrusion 241a protrudes radially outward. Movable piece 242 is supported onto protrusion 241a by supporting pin 243. Movable piece 242 rotates in the radial direction of rotating shaft 21 around supporting pin 243.

As shown in FIG. 10, movable piece 242 is configured with concave outer piece 242a arranged on the outer side of flexible blade 23 and concave inner piece 242b arranged on the inner side of flexible blade 23. Movable piece 242 holds the other end 23b of flexible blade 23 by sandwiching the other end 23b of flexible blade 23 with outer piece 242a and inner piece 242b.

Supporting pin 243 penetrates through a side of movable piece 242 and a side of protrusion 241a that configures core 241 to let movable piece 242 supported by core 241. Supporting pin 243 provides support so that movable piece 242 can rotate with respect to core 241 around supporting pin 243.

Movable piece 242 described above opens and closes in the radial direction of axis member 252 (i.e. the radial direction of rotating shaft 21) around supporting pin 243. Thus, coupling mechanism 24 guides the other end 23b side of flexible blade 23 to a closed form in which the outer end is parallel to the axial direction of rotating shaft 21 and to an opened form in which the outer end is opened outwardly in the radial direction of rotating shaft 21, respectively.

Since juice extractor body 2 is provided with this coupling mechanism 24, it is possible, when flexible blade 23 is bent and outwardly expanded, to make the degree of outward expansion of flexible blade 23 small on the blade guide 25 side and to make it large on the other end 23b side, as shown in FIG. 5. It should be noted that a hole is created in advance in the skin of material M to be juice-extracted and the juice extractor body is inserted into material M through such hole. With this juice extractor body 2, since the degree of expansion of flexible blade 23 is smaller on the blade guide 25 side than the other end 23b side, the hole in the skin is prevented from being damaged by flexible blade 23.

The coupling mechanism may be configured as shown in FIG. 11. Coupling mechanism 24A shown in FIG. 11 includes: three projections 246 attached to the tip of axis member 252; movable piece 247 attached to the other end of flexible blade 23; and three supporting pin 248 that rotatably supports the other end 23b of flexible blade 23 with respect to projection 246.

Three projections 246 are provided at the tip of axis member 252. Each projection 246 is column-shaped and extends from the tip of axis member 252 to farther out from axis member 252 (downward in FIG. 11).

Movable piece 247 is attached to an inner surface or outer surface of flexible blade 23. In the example shown in FIG. 11, movable piece 247 is attached to an inner surface of flexible blade 23. Movable piece 247 forms insertion part 247a that extends in the width direction of flexible blade 23. Insertion part 247a is configured by bending a part of movable piece 247 so as to make a gap with respect to flexible blade 23. Insertion part 247a has supporting pin 248 inserted therein.

Supporting pin 248 has end parts thereof in the axial direction thereof fixed to the tip of the respective projections 246. Supporting pin 248 couples the other end 23b of flexible blade 23, to which movable piece 247 is attached, to projection 246. Supporting pin 248 arranges the other end 23d of flexible blade 23 between projections 246 and supports the other end 23b side of flexible blade 23 with respect to axis member 252.

(Blade Slider)

As shown in FIGS. 3 to 5, blade slider 22 has rotating shaft 21 passing through the center thereof and is configured such that it is capable of reciprocation in the axial direction of rotating shaft 21. As shown in FIG. 12, blade slider 22 includes inner cylinder 221, spacer 222 and outer cylinder 223. Inner cylinder 221 slides in the axial direction of rotating shaft 21. Spacer 222 holds one end 23a of flexible blade 23 by fitting around the outer circumference of inner cylinder 221. Outer cylinder 223 forms an outer shell of blade slider 22 and maintains a form in which one end 23a of flexible blade 23 is held by inner cylinder 221 and spacer 222, which is a member for fitting.

Inner cylinder 221 is provided with three dents 221a formed in the outer circumference thereof and male screw 221b formed above dents 221a. Dents 221a are formed on inner cylinder 221 in a circumferential direction at regular intervals. Dent 221a is opened at the position of the lower end part of inner cylinder 221. In addition, inner cylinder 221 has a hole in the center thereof for passing rotating shaft 21 therethrough. This hole has a hexagonal shape and prevents blade slider 22 from rotating in the circumferential direction around rotating shaft 21. Inner cylinder 221 rotates together with rotating shaft 21. It should be noted that when the cross-sectional shape of rotating shaft 21 is circular, a baffle may be provided to rotating shaft 21 such that inner cylinder 21 rotates together with rotating shaft.

Spacer 222 is configured with ring 222b for fitting around the outer circumference of inner cylinder 221 and three clicks 222a that extend from ring 222b to the other end 23b side of flexible blade 23 (downside in FIG. 12). Spacer 222 tucks, between spacer 222 and inner cylinder 221, one end 23a of flexible blade 23 and thus, holds one end 23a of flexible blade 23 thereat.

Outer cylinder 223 is cylindrical. The inside of outer cylinder 223 is hollow. Outer cylinder 223 has, at an inner circumference part thereof, a female screw (not shown) to be screwed into male screw 221b of inner cylinder 221. Outer cylinder 223 maintains the form in which inner cylinder 221 and spacer 222 hold one end 23a of flexible blade 23.

Blade slider 22 holds flexible blade 23 as below. One end 23a of flexible blade 23 is arranged in dent 221a of inner cylinder 221. Spacer 222 is then fitted around the outer circumference of inner cylinder 221. By fitting spacer 222 around outer circumference of inner cylinder 221, click 222a presses an outer surface of one end 23a of flexible blade 23 arranged in dent 221a. One end 23a of flexible blade 23 is sandwiched and held between dent 221a and click 222a of spacer 222. By the female screw formed in the inner circumference surface of outer cylinder 223 being screwed in with male screw 221b of inner cylinder 221, outer cylinder 223, inner cylinder 221 and spacer 222 become integrated. When outer cylinder 223 is screwed into male screw 221b of inner cylinder 221, the inner circumference surface of outer cylinder 223 pushes spacer 222 against the outer circumferential surface of inner cylinder 221. Thus, one end 23a of flexible blade 23 is fixed strongly to blade slider 25.

Blade slider 22 changes the form of flexible blade 23 from the linearly extended form to the bent and outwardly expanded form or vice versa, between the other end 23b thereof (the lower end of flexible blade 23 shown in FIGS. 3 to 5) and blade guide 25, by sliding one end 23a of flexible blade 23 in the axial direction of rotating shaft 21.

When blade slider 22 moves in the axial direction of rotating shaft 21 toward blade guide 25 from the form shown in FIG. 3, blade slider 22 moves one end 23a of flexible blade 23 to the blade guide 25 side. When blade slider 22 moves to the blade guide 25 side, as shown in FIG. 4, flexible blade 23 bends and is expanded outwardly between the other end 23b thereof and blade guide 25. When blade slider 22 slides to a position closest to blade guide 25, as shown in FIG. 5, flexible blade 23 is expanded outwardly to the maximum between the other end 23b thereof and blade guide 25.

On the other hand, when blade slider 22 moves in the axial direction of rotating shaft blade 21 in a direction away from blade guide 25, one end 23a of flexible blade 23 moves together with blade slider 22 in the direction away from blade guide 25. When blade slider 22 moves in the direction away from blade guide 25, flexible blade 23 restores to the linearly extended form (i.e. the form shown in FIG. 3) from the expanded form.

[Basic Configuration of Juice Extractor]

Next, juice extractor S that makes use of juice extractor body 2 will be described. As shown in FIG. 13, juice extractor S is provided with: rotating shaft 21; driving force transmission mechanism 3 that includes shaft holder 33 that removably holds rotating shaft 21 and transmits driving force for rotating rotating shaft 21; flexible blade 23, the longitudinal direction thereof being coincident with the axial direction of rotating shaft 21, flexible blade 23 being arranged around rotating shaft 21; blade guide 25 provided at the intermediate position in the longitudinal direction of flexible blade 23; and sliding mechanism 4 for sliding one end 23a in the longitudinal direction of flexible blade 23 in the axial direction of rotating shaft 21.

One end 23a in the longitudinal direction of flexible blade 23 is configured to be slidable in the axial direction of rotating shaft 21. In addition, the other end 23b in the longitudinal direction of flexible blade 23 is coupled to axis member 252. In association with the sliding of one end 23a of flexible blade 23, flexible blade 23 changes from the linearly extended form to the bent and outwardly expanded form or vice versa, between the other end 23b thereof and blade guide 25. It should be noted that the other end 23b in the longitudinal direction of flexible blade 23 may be coupled to rotating shaft 21 (see FIG. 9).

[Specific Configuration of Juice Extractor]

Juice extractor S is mainly configured with: housing 1; juice extractor body 2; driving force transmission mechanism 3; and sliding mechanism 4. For juice extractor S, there are a type in which juice extractor body 2 is rotatably driven by electric power and a type in which juice extractor body 2 is rotatably driven by hand. Hereinafter, juice extractor S in which juice extractor body 2 is rotatably driven by electric power will be described as an example. It should be noted that in the present specification, with juice extractor S in the condition shown in FIG. 13, the description will be provided with the vertical direction in FIG. 13 considered as corresponding to the vertical direction of juice extractor S.

(Housing)

Housing 1 includes: base 11; supporting post 12; first frame 13, the cross-sectional shape thereof being a "U" shape laid sideways; and second frame 14, the cross-sectional shape thereof being an "E" shape.

Base 11 is a part for grounding juice extractor S. In the example of juice extractor S shown in FIG. 13, base 11 is configured with four protruding parts which extend outwardly from the middle in the horizontal direction. However, the shape of base 11 is not limited to the one shown in FIG. 13, and, for example, it may be formed into a circle, square or the like. Supporting post 12 extends upwardly from the middle of base 11. First frame 13 is attached to the top part of supporting post 12. The opened part of first frame 13 faces backward of juice extractor S and the closed part of first frame 13 faces forward of juice extractor S. First frame 13 holds motor 31 therein. Second frame 14 is provided closer to the front part side of juice extractor S than first frame 13. The opened part of second frame 14 faces forward of juice extractor S and the closed part of second frame 14 faces backward of juice extractor S. Second frame 14 holds shaft holder 33 (described later) therein.

(Driving Force Transmission Mechanism)

Driving force transmission mechanism 3 is a mechanism for transmitting a driving force of motor 31 to rotating shaft 21. Driving force transmission mechanism 3 includes: driving pulley 32 attached to a driving axis of motor 31; shaft holder 33 that removably holds one end side of rotating shaft 21; following pulley 34 attached to shaft holder 33; and toothed belt 35 which is passed around driving pulley 32 and following pulley 34.

Rotation of the driving axis of motor 31 is sequentially transmitted to driving pulley 32, toothed belt 35, following pulley 34 and shaft holder 33. Shaft holder 33 rotates by way of the rotation of the driving axis of motor 31 being transmitted to shaft holder 33. Rotating shaft 21 held by shall holder 33 rotates in association with the rotation of shaft holder 33. It should be noted that juice extractor S is provided with a power supply switch (not shown) for activating motor 31. Such power supply switch (not shown) coordinates with a manipulation lever (described hereinafter) and is automatically switched on or off by moving the manipulation lever.

Heretofore, the case in which driving force transmission mechanism 3 includes driving pulley 32, following pulley 34 and toothed belt 35 has been described as an example. However, driving force transmission mechanism 3 may be configured, for example, by a group of gears which is formed by engaging a plurality of gears with each other.

(Sliding Mechanism)

As shown in FIGS. 13 and 14, sliding mechanism 4 is provided with: manipulation lever 41; rotating axis 42; arm 43; sliding plate 44, guide pole 45 and spring damper 46.

Manipulation ever 41 includes a pair of lever members 410 and grip 411 to be gripped by hand. Grip 411 couples the upper ends of lever members 410 to each other. As shown in FIGS. 13 and 14, manipulation lever 41 has an upside down "U" shape.

Rotating axis 42 extends in the horizontal direction. Rotating axis 42 connects the lower parts of lever members 410 to each other. Rotating axis 42 and manipulation lever 41 are configured as a single unit. Rotating axis 42 rotates together with manipulation lever 41, in association with the rotation of manipulation lever 41 around rotating axis 42.

Arm 43 is configured with a pair of arm members 430 that protrude forward of juice extractor S. The pair of arm members 430 are fixed to rotating axis 42 on the inner side of lever members 410. In addition, each arm member 430 configuring arm 43 is provided with long groove 431 from the tip thereof to a midway position in the longitudinal direction of each arm member 430. When rotating axis 42 is rotated by rotating manipulation lever 41 around rotating axis 42, arm 43 rotates around rotating axis 42 in association with the rotation of rotating axis 42. It should be noted that, prior to manipulating and actuating juice extractor S (i.e. prior to manipulating manipulation lever 41), an opened part formed at the tip of each arm member 430 is directed obliquely upward and forward of juice extractor S (i.e. outward of juice extractor S).

Sliding plate 44 slides blade slider 22 in the vertical direction (i.e. the axial direction of rotating shaft 21). Sliding plate 44 is provided, on each side thereof, with pin 441 that protrudes outwardly. Each pin 441 is inserted into long groove 431 formed in each arm member 430. Each pin 441 slides inside long groove 431.

Sliding plate 44 moves vertically in tandem with vertical movement of the tip of arm 43 when arm 43 rotates around rotating axis 42. In doing so, each pin 441 slides inside long groove 431 in the longitudinal direction thereof.

Guide pole 45 is an elongated member that extends vertically. Guide pole 45 is provided between intermediate support plate 14b and lower support plate 14c of second flame 14. Guide pole 45 is passed through a hole (not shown) made in sliding plate 44 and guides the vertical movement of sliding plate 44. In addition, guide pole 45 is provided with stopper 451 at a lower part thereof. Stopper 451 limits the movement of sliding plate 44 by allowing sliding plate 44 to bump thereon. It should be noted that the length over which sliding plate 44 moves may be adjusted by changing the height of stopper 451.

Spring damper 46 obliquely couples lower support plate 14c of second frame 14 to an upper end of arm 43. Spring damper 46 pushes manipulation lever 41 upward when the lowered manipulation lever 41 returns to its original position and assists in restoration of manipulation lever 41 to its original position. Further, spring damper 46 prevents abrupt lowering of manipulation lever 41 and adjusts the rate at which manipulation lever 41 is manipulated. As a result, the rate in which juice extractor body 2 descends is adjusted.

(Juice Extractor Body)

As already described with reference to FIGS. 3 to 12, the specific configuration of juice extractor body 2 is provided with: rotating shaft 21; flexible blade 23 arranged around rotating shaft 21; coupling mechanism 24 that connects one end 23a in the longitudinal direction of flexible blade 23 to the tip of axis member 252; blade slider 22 that slides the other end 23b of flexible blade 23 in the axial direction of rotating shaft 21; and blade guide 25 arranged at an intermediate position in the longitudinal direction of flexible blade 23.

It should be noted that the degree of bending of flexible blade 23 is set by sliding plate 44 bumping onto the stopper 451 attached to guide pole 45. More specifically, when sliding plate 44 bumps onto stopper 451 attached to guide pole 45, the maximum degree of bending of flexible blade 23 is obtained. By setting the height of stopper 451 is located to a desired height, the degree of bending of the flexible blade can be changed. However, the degree of bending of flexible blade 23 may also be set by allowing blade slider 22 to bump onto blade guide 25. It should be noted that the specific configuration of juice extractor body 2 has already been described, and thus, the description thereof will be omitted here.

(Shaft Holder)

As shown in FIG. 15, shaft holder 33 is provided with: tubular holder body 331; holder lid body 332 that is covered over an upper end part of holder body 331; built-in slider 333 that is provided inside holder lid body 332 and that slides horizontally inside holder lid body 332; and built-in spring 334 that is provided inside holder lid body 332 and that biases built-in slider 333 in a horizontal direction.

Holder body 331 is configured by upper end part 331a, center part 331b and lower end part 331c. Upper end part 331a has lower end part 332c of holder lid body 332 pressed fit and fixed therein. Center part 331b has following pulley 34 fitted therein. Lower end part 331c has its outer circumference surface attached to the second frame and the space defined by its inner circumference surface inserted with rotating shaft 21. Upper end part 332*c* of holder lid body 332 is attached to upper support plate 14*a* of second frame 14 such that it rotates smoothly therein. On the other hand, lower end part 331*c* of holder body 331 is fitted into intermediate support plate 14*b* of second frame 14 such that it rotates smoothly therein. Thus, shaft holder 33 rotates smoothly.

Holder lid body 332 includes upper space 332*a* and lower space 332*b*. Upper space 332*a* accommodates head part 211 of rotating shaft 21 therein. Lower space 332*b* is a long groove having one end thereof opened. Lower space 332*b* accommodates therein, on the lower side of upper space 332*a*, built-in slider 333 and built-in spring 334.

Built-in slider 333 is arranged inside lower space 332*b*. The inner diameter of built-in slider 333 gradually narrows down from bottom to top and has a circular truncated cone-shaped inner circumference surface 333*b*. Built-in slider 333 moves to the right of FIG. 15 by being applied with force from built-in spring 334. In addition, built-in slider 333 moves to the left of FIG. 15, by means of rotating shaft 21, by being pushed by a force larger than that of built-in spring 334.

In the form where built-in slider 333 is moved to the right of FIG. 15, the central axis of inner circumference surface 333*b* and the central axis of upper space 332*a* of holder lid body 332 are out of alignment from each other (i.e. in an offset form). In this form, when head part 211 of rotating shaft 21 is inserted into shaft holder 33 from the bottom, chamfered head part 211 of rotating shaft 21 bumps onto inner circumference surface 333*b*. Thus, built-in slider 333 moves to the left of FIG. 15 (the inner side of shaft holder 33). Specifically, built-in slider 333 slides to the central axis side of rotating shaft 21. Head part 211 of rotating shaft 21 penetrates through the specie defined by inner circumference surface 333*b* of built-in slider 333 from bottom to top and reaches upper space 332*a*. After head part 211 reaches upper space 332*a*, built-in slider 333 is applied with force by built-in spring 334 and is returned to a position of narrow-diameter part 212 formed on the lower side of head part 211. Consequently, an under surface of head part 211 of rotating shaft 21 is hooked onto the upper end surface of built-in slider 333 and thus, rotating shaft 21 is held by shaft holder 33.

In order to release the holding of rotating shaft 21 by shaft holder 33, in the form in which such shaft is held by shaft holder 33, button 333*a* provided at an extension of built-in slider 333 is pressed from the right to the left of FIG. 15. By pressing button 333*a*, built-in slider 333 is pressed to the left of FIG. 15 with a force larger than that of built-in spring 334. When built-in slider 333 moves, the central axis of inner circumference surface 333*b* and the central axis of upper space 332*a* coincide with each other. Rotating shaft 21 can then be removed from shaft holder 33 by letting its head part 211 pass through the space defined by inner circumference surface 333*b*.

[Core Removal Tool]

Core removal tool 50 is a tool for removing the core of material M. FIG. 16 shows one example of core removal tool 50. Core removal tool 50 has a linearly-extended, elongated tubular shape. Core removal tool 50 is provided with handle 51 to be gripped by hand and cutting edge part 53 that creates a hole in material M's skin and that removes the core of material M. Handle 51 and cutting edge part 53 are connected to each other through intermediate part 52. Intermediate part 52 has an arc shape. A front part of core removal tool 50 is opened.

As shown in FIG. 17, core removal tool 50 may be configured such that bend part 54 is provided in the intermediate part in the longitudinal direction to obtain a folded shape. Core removal tool 50 can easily remove the core from material M by making use of the folded shape.

First, using cutting edge part 53 of core removal tool 50, a hole is made in the skin of material M. As shown in FIG. 17(A), core removal tool 50 is inserted inside material M from such hole. Next, core removal tool 50 is rotated around its axis within material M. Next, as shown FIG. 17(B), using bend part 54 formed at intermediate part 52 as a fulcrum, handle 51 is moved toward the center side of material M. Due to this action, cutting edge part 53 of core removal tool 50 moves outside the core position of material M and cutting edge part 53 cuts the core of material M from material M. Thereafter, core removal tool 50 is extracted from material M. As described above, intermediate part 52 of core removal tool 50 is opened. Thus, when core removal tool 50 is extracted from material M, juice generated through core-extraction work flows from intermediate part 52 into the inner side of material M and core removal tool 50 can extract only the core of material M from material M.

Core removal tool 60 may also be configured as shown in FIG. 18. Core removal tool 60 has a cylindrical shape. Core removal tool 60 is provided with a handle (not shown) to be gripped by hand and cutting edge part 63. The handle and cutting edge part 63 are connected to each other through intermediate part 62. Intermediate part 62 has an opened part that connects the inside and the outside of core removal tool 60 to each other. Core removal tool 60 is provided with a pair of catching pieces 65 on the inner side of cutting edge part 63. Catching piece 65 is a part that catches the core separated from material M and that removes such core from material M.

Catching pieces 65 assume a closed form, as shown in FIG. 18(A), when inserting core removal tool 60 into material M. On the other hand, catching pieces 65 assume an opened form, as shown in FIG. 18(B), when extracting core removal tool 60 from material M. The core of material M is caught by catching pieces 65 in the opened form and is removed from the fruit in association with the extraction of core removal tool 60 from material M.

[Material]

Any type, shape, size or the like of material may be used for material M, which is a target to be juice-extracted by juice extractor S described above. However, fruit and vegetables with a relatively thick skin, with the inside thereof being relatively soft and with a relatively high content of water are preferred. Typical examples of material M include citrus fruits such as grapefruits, oranges, lemons, Hassaku oranges, mandarins and the like, and gourds such as various melons, watermelons and the like. In addition, vegetables such as pumpkins and the like may be used as material M.

[Function and Use]

When extracting juice from material M with juice extractor body 2 configured as described above and juice extractor S having such juice extractor body 2, juice extractor body 2 and juice extractor S provide the following functions.

First, a hole is created in the upper center of the skin of material M, into which juice extractor body 2 can be inserted, with flexible blade 23 being in the linearly extended form (i.e. the diameter-reduced form). Such hole is created using core removal tool 50, 60, described above. In addition, the core of material M is removed using core removal tool 50, 60.

Next, by holding the lower part of material M by hand, the hole made in the skin of material M is moved directly under juice extractor body 2. Juice extractor body 2 is then inserted into the inside of material M from the hole in the skin.

Subsequently, manipulation lever 41 of sliding mechanism 4 is manipulated. By gripping grip 411 by hand, manipulation lever 41 is pressed down with a force larger than that of spring damper 46. A power supply switch is automatically turned on in tandem with the movement of manipulation lever 41, and motor 31 is driven. The driving of motor 31 is transmitted to shaft holder 33 by means of driving force transmission mechanism 3 and juice extractor body 2, held by shaft holder 33, is rotated. In addition, depending on the distance over which manipulation lever 41 is pressed down, blade slider 22 slides along rotating shaft 21 to the blade guide 25 side. Depending on the distance over which blade slide 22 slides, flexible blade 23 is gradually expanded outwardly by gradually increasing the degree of bending, as shown in FIG. 5, from the linearly extended form shown in FIG. 4.

Juice extractor body 2 rotates, with flexible blade 23 in the expanded form, on the inner side of the skin of material M, and thus, fruit pulp (including vegetable cells), endodermis, fibers or the like present on the inner side of the skin is sequentially ruptured, fractured, agitated or the like from the center of material M toward the outer side thereof (i.e. to the diameter-expanding side). Thus, juice is extracted from material M on the inner side of the skin, while leaving the skin behind.

While performing juice extraction, it is preferable to decenter material M from its core and to slowly rotate material M. When juice is extracted by decentering material M from its core and by slowly rotating material M, the flexible blade touches the fruit pulp evenly on the inner side of the skin. Thus, juice can be extracted from material M without waste.

After completion of the juice extraction from material M, manipulation lever 41 that has been pressed down is restored to its original position. When manipulation lever 41 is restored to its original position, the expanded flexible blade 23 is also restored to the linearly extended form. In addition, the power supply switch of motor 31 is automatically turned off and the rotation of juice extractor body 2 stops. When juice extractor body 2 is extracted from material M in this condition, extracted juice is obtained on the interior of the skin, while leaving the skin behind, and the juice extraction work is completed.

The obtained extracted juice can be provided by making use of the skin as a vessel and by inserting a straw into the hole made in the skin. However, the obtained extracted juice can also be transferred into a separately-prepared vessel from the hole made in the skin of material M and can then be provided. When providing the obtained extracted juice, it is also possible to add alcohol, such as a liqueur or the like, carbonated water, or a sweetener, etc. from the hole made in the skin. It should be noted that juice may be extracted from material M in a room temperature condition, or a cooled or heated condition, as may be necessary. When juice extraction is performed on frozen material M, sherbet may be obtained.

[Receiving Vessel]

Receiving vessel 70 is a vessel for receiving material M. Receiving vessel 7 is provided separately from juice extractor S. As shown in FIG. 19, receiving vessel 70 is configured with, for example, cylindrical peripheral wall 71 and bottom surface 72. In addition, peripheral wall 71 is provided with a plurality of projection parts 73 at an upper part thereof. Projection parts 73 are arranged in a circumferential direction at regular intervals. Projection parts 73 are parts to be stuck into the skin of material M. Trough part 74 between projection parts 73 is evenly formed as shown in FIG. 19. However, trough part 74 may also be formed into a shape in which it is dented toward the lower side of receiving vessel 70. When the shape of trough part 74 is dented toward the lower side, a finger may be inserted between material M and trough part 74 when removing material M from receiving vessel 70 and thus, material M can be easily removed from receiving vessel 70.

At the time of juice extraction from material M, receiving vessel 70 receives the bottom of material M at the upper part of peripheral wall 71, as shown in FIG. 19, and is used by holding the bottom surface 72 side of receiving vessel 70 by hand. In doing so, projection parts 73 are stuck into the skin of material M to receive material M. By projection parts 73 being stuck into the skin, material M is fixed in receiving vessel 70. It should be noted that, when this receiving vessel 70 is used, it is also possible to extract juice without holding material M by hand and in a condition where receiving vessel 70 is placed.

FIG. 20 shows the case in which juice is extracted in a condition in which material M is placed. In this case, material M is placed on receiving vessel 70 by tilting the direction in which the core extends. When flexible blade 23 is bent and expanded as shown in FIGS. 4 and 5, the other end 23b side of flexible blade 23 expands outwardly to a larger degree than the blade guide 25 side thereof. By placing material M on receiving vessel 70 by tilting the direction in which core CL1 of material M extends with respect to central line CL2 of juice extractor body 2, the other end 23b side of flexible blade 23 expands to the area immediately close to the skin on the inner side of the skin of material M and thus, the juice is extracted without leaving the upper side of material M behind.

In addition, when juice is extracted in a condition in which material M is placed, cover 80 that covers the upper side of material M may be provided to juice extractor S. Cover 80 holds down the placed material M and prevents any positional displacement thereof.

[Details of Flexible Blade]

The material properties and the mechanical properties of flexible blade 23 will now be described in detail. Flexible blade 23 has the intermediate part in the longitudinal direction thereof bent outwardly in the radial direction within material M and is rotated in such form by means of rotating shaft 21 to perform juice extraction. In addition, flexible blade 23 has a property by which it linearly extends again by the restoring force of flexible blade 23 itself from the bent form.

The desirable properties of flexible blade 23 may include low rigidity (small value of Young's modulus), high strength and high durability (high fatigue resistance). The extracted juice is often acidic or alkaline, instead of neutral. Thus, it is preferable for flexible blade 23 to have high corrosion resistance.

One example of a preferred material is titanium alloy. It should be noted that, in the present specification, titanium alloy refers to an alloy containing Ti, and the content of Ti is not limited. Specifically, when the whole titanium alloy is assumed to be 100 mol %, the content percentage of Ti may be 50 mol % or less. In addition, such titanium alloy is not limited to a titanium alloy with a non-linear relationship between stress and strain in the elastic deformation zone but it also includes a titanium alloy with a linear relationship between stress and strain. Such titanium alloy will be described in detail hereinafter.

(Tensile Elastic Limit Strength and Average Young's Modulus)

Such titanium alloy preferably has the following mechanical properties:

(1) The tensile elastic limit strength is 700 MPa or higher. However, the tensile elastic it strength is preferably 800 MPa or higher, is more preferably 900 MPa or higher, and is even more preferably 1000 MPa or higher. It should be noted that the tensile elastic limit strength is defined as the stress when (true) permanent strain in a tensile test reaches 0.2%.

(2) The average Young's modulus is 100 GPa or lower. However, the average Young's modulus is preferably 80 GPa or lower, is more preferably 75 GPa or lower, and is even more preferably 65 GPa or lower. It should be noted that the average Young's modulus is determined as a slope of a tangent at a stress position corresponding to ½ of the tensile elastic limit strength in the stress-strain diagram obtained from the tensile test.

Here, the tensile elastic limit strength refers to the stress that occurs by a load when a permanent elongation (strain) reaches 0.2% in the tensile test in which applying a load to a test piece and removing the load therefrom are repeated. In this regard, the tensile elastic limit strength is different from the tensile strength which is determined by dividing the final weight of a test piece just before fracture in the tensile test by the cross-sectional area prior to the test in a parallel part of such test piece.

In addition, the average Young's modulus is not a precise average of Young's modulus but rather it refers to a representative value of Young's modulus. Accordingly, in the case of a titanium alloy with a linear relationship between stress and strain in the elastic deformation zone, the average Young's modulus thereof is synonymous with a general Young's modulus which can be determined as a slope of the straight line passing through the origin in the stress-strain diagram. On the other hand, in the case of a titanium alloy with a non-linear relationship between stress and strain in the elastic deformation zone, the Young's modulus cannot be determined as a slope of the straight line passing through the origin in the stress-strain diagram. Thus, in the present specification, the average Young's modulus described above is used as a comprehensive concept.

With reference to FIG. 21, the tensile elastic limit strength and average Young's modulus of flexible blade 23 made of the titanium alloy described above will be described. FIG. 21 is a stress-stain diagram (schematic diagram), and the horizontal axis in FIG. 21 represents strain and the vertical axis in FIG. 21 represents stress. In addition, σt in FIG. 21 denotes tensile strength and εe denotes strain at tensile elastic limit strength (σe).

The stress-stain diagram of flexible blade 23 does not show linearity in the elastic deformation zone of flexible blade 23 and, instead, assumes a curve which is convex on the upper side (I'-II). When the weight applied to flexible blade 23 is removed, the length thereof varies along curve II-I' and the elongation returns to 0 or the length thereof varies along curve II-II' and the permanent strain remains.

Flexible blade 23 made of a titanium alloy with high strength and low Young's modulus as described above has excellent elastic deformation properties. Thus, even when flexible blade 23 is largely bent, it is elastically deformed and is hard to plastic-deform. In addition, flexible blade 23 made of such titanium alloy has high strength and also has high fatigue strength (fatigue limit). Further, since such flexible blade 23 has a low Young's modulus, the bend stress, which occurs in association with the bending, is relatively small. Accordingly, even when a load is repeatedly applied to flexible blade 23 in a largely-bent form so as to extract juice from material M, such flexible blade 23 can still be used over a long period of time in good condition. Moreover, the surface of flexible blade 23 is formed with a passive state coating (titanic oxide) and thus, it also excels in corrosion resistance.

Further, regarding the titanium alloy described above, the relationship between stress and strain in the elastic deformation zone is non-linear (i.e. when the stress-strain curve is convex on the upper side), a high elastic deformation property can be obtained. Such titanium alloy is described in detail in, for example, JP3375083B, JP3827149B, JP4123937B and JP4408184B. In addition, such titanium alloy is commercially available as GUMMETAL (registered trademark of Toyotsu Material Incorporated).

By applying cold working to the titanium alloy (in particular, GUMMETAL), both a low Young's modulus and a high strength can be easily obtained. Thus, it is preferable to use a cold-worked titanium alloy for flexible blade 23. It should be noted that "cold working" refers to plastic working performed at a temperature (for example, room temperature) below the recrystallization temperature (i.e. the lowest temperature that causes recrystallization). Examples of cold working include cold rolling, cold pressing, cold reduction, cold drawing, cold swaging or the like.

(Composition)

The titanium alloy described above preferably contains no Ni, Co, Sn, Cr, Al or the like, which may become incentive elements for allergies or the like. For example, when the entirety is assumed to be 100 mass %, such titanium alloy preferably contains: one or more types of Va group (vanadium group) elements (V, Nb, Ta) in the amount ranging from 30 mass %, to 60 mass %, inclusive; Zr and/or Hf in the amount of 20 mass % or less (preferably 10 mass % or less) in total; and the remainder including Ti, inevitable impurities and/or a small amount of reformed elements. V, Nb and Ta are β-phase stabilization elements, and they lower the Young's modulus of the titanium alloy and also improve cold-workability thereof. Zr and Hf are elements which are effective for lowering the Young's modulus and increasing the strength of the titanium alloy. It should be noted that part of the Zr or Hr may be substituted with Sc, which is effective for lowering the Young's modulus.

O is a typical example of reformed elements of titanium alloy. When the entirety is assumed to be 100 mass %, O is preferably included in the titanium alloy in a range between 0.08 mass % and 0.6 mass %, inclusive, and more preferably in the range between 0.15 mass % and 0.5 mass %, inclusive. In addition, O is an element which is effective for improving the strength of titanium alloy, and by coexisting with a Va group element, it can achieve both a lowering of the Young's modulus and an increase in the strength of the titanium alloy. It should be noted that, alternatively or in addition to O, C in the amount ranging from 0.05 mass % to 1.0 mass %, inclusive, or B in the amount ranging from 0.01 mass % to 1.0 mass %, inclusive, may also be contained.

By using flexible blade 23 made of the titanium alloy described above in juice extractor body 2, juice extraction can be performed over a long period of time. It should be noted that, regardless of the alloy composition, the titanium alloy configuring flexible blade 23 may be any of α type, α+β type or β type, as long as it has the mechanical properties described above. However, the titanium alloy configuring flexible blade 23 is typically of a β type.

It should be noted that flexible blade 23 may be configured with a material other than the titanium alloy described above, as long as such material has a certain elasticity, durability and corrosion resistance. For example, flexible blade 23 may be configured with stainless steel, a plastic material, a carbon material, or any composite material thereof.

[Performance Confirmation of Juice Extraction]

Juice extraction was carried out on grapefruits using juice extractor S having the configuration described above. Approximately 100 grapefruits were juice-extracted without any problems. When flexible blade 23 was made of GUM-METAL described above, juice extractor S was capable of juice-extracting 1,000 grapefruits in a good condition.

DESCRIPTIONS OF REFERENCE NUMERALS

S Juice extraction
M Material
1 Housing
11 Base
12 Supporting post
13 First frame
14 Second frame
2 Juice extractor body
21 Rotating shall
22 Blade slider
221 Inner cylinder
221a Dents
222 Spacer
222a Clicks
222b Ring
223 Outer cylinder
23 Flexible blade
23a One end
23b Other end
24, 24A Coupling mechanism
241 Core
241a Protrusion
242b Movable piece (supporter)
242a Outer piece
242b inner piece
243 Supporting pin
246 Projection
247 Movable piece
248 Supporting pin
25, 25A Blade guide
251a Guide hole
251b Outwardly widened part
252 Axis member
3 Driving force transmission mechanism
31 Motor (rotary drive source)
32 Driving pulley
33 Shaft holder
331 Holder body
332 Holder lid body
333 Built-in slider
334 Built-in spring
34 Following pulley
35 Toothed belt
4 Sliding mechanism
41 Manipulation lever
410 Lever member
411 Grip
42 Rotating axis
43 Arm
430 Arm members
431 Long groove
44 Sliding plate
441 Pin
45 Guide pole
46 Spring damper
50, 60 Core removal tool
70 Receiving vessel
80 Cover

The invention claimed is:

1. A juice extractor body mounted on a juice extractor, the juice extractor has a driver transmitting a driving force to the juice extractor body, the juice extractor body comprising:
a rotating shaft that rotates based on the driving force transmitted from the driver;
a flexible blade that is arranged parallel to the rotating shaft, a longitudinal direction thereof being coincident with an axial direction of the rotating shaft, one end in the longitudinal direction of the flexible blade being slid in the axial direction of the rotating shaft;
a blade slider that is slidably provided at the one end of the flexible blade, and moves in the axial direction of the rotating shaft; and
a blade guide that is provided at an intermediate position between the blade slider and a first end of the rotating shaft in the longitudinal direction of the flexible blade, and controls a form of the flexible blade when is bent and outwardly expanded based on the movement of the blade slider, the first end of the rotating shaft being formed at the other end of the flexible blade,
wherein the flexible blade penetrates through the blade guide, and the other end in the longitudinal direction of the flexible blade is attached to an axis member that extends from the blade guide to the other end side of the flexible blade or to the rotating shaft, and
wherein the flexible blade changes from a form in which the flexible blade is linearly extended to a form in which the flexible blade is bent and outwardly expanded or vice versa, between the other end of the flexible blade and the blade guide, in association with the sliding of the one end of the flexible blade.

2. The juice extractor body according to claim 1, wherein the length between the blade guide and the one end of the flexible blade is set in accordance with the size of a target to be juice-extracted.

3. The juice extractor body according to claim 1, further comprising
a coupler that connects the other end of the flexible blade to the axis member or to the rotating shaft,
wherein the coupler guides the other end side of the flexible blade to a closed form in which the other end is parallel to the axial direction of the rotating shaft and to an opened form in which the other end is opened outwardly in a radial direction of the rotating shaft, respectively.

4. The juice extractor body according to claim 1, wherein the blade guide includes a guide hole through which the flexible blade is passed, and
the guide hole has a part outwardly widened in the radial direction of the rotating shaft on the other end side of the flexible blade.

5. The juice extractor body according to claim 1, wherein the flexible blade is formed of a metal material which has flexibility, a plastic material, a carbon material or a composite material thereof.

6. A juice extractor, comprising:

a rotating shaft;

a driver that has a shaft holder that removably holds the rotating shaft and transmits a driving force for rotating the rotating shaft;

a flexible blade that is arranged parallel to the rotating shaft, a longitudinal direction thereof being coincident with an axial direction of the rotating shaft;

a blade slider for sliding one end in the longitudinal direction of the flexible blade in the axial direction of the rotating shaft; and a blade guide provided at an intermediate position between the blade slider and a first end of the rotating shaft in the longitudinal direction of the flexible blade, and controls a form of the flexible blade when is bent and outwardly expanded based on the movement of the blade slider, the first end of the rotating shaft being formed at the other end of the flexible blade, wherein the flexible blade penetrates through the blade guide, and the other end in the longitudinal direction of the flexible blade is attached to an axis member that extends from the blade guide to the other end side of the flexible blade or to the rotating shaft, and wherein the flexible blade changes from a form in which the flexible blade is linearly extended to a form in which the flexible blade is bent and outwardly expanded or vice versa, between the other end of the flexible blade and the blade guide, in association with the sliding of the one end of the flexible blade.

7. The juice extractor according to claim 6, further comprising a coupler that connects the other end of the flexible blade to the axis member or to the rotating shaft, wherein the coupler guides the other end side of the flexible blade to a closed form in which the other end is parallel to the axial direction of the rotating shaft and to an opened form in which the other end is opened outwardly in a radial direction of the rotating shaft, respectively.

* * * * *